United States Patent

[11] 3,629,840

[72] Inventor Robert E. Cullen
Foxborough, Mass.

[21] Appl. No. 31,475
[22] Filed Apr. 24, 1970
[45] Patented Dec. 21, 1971
[73] Assignee Eastman Kodak Company

[54] APPARATUS FOR SENSING AND COUNTING IMAGES DISPOSED ON INFORMATION-BEARING MEDIA
17 Claims, 31 Drawing Figs.

[52] U.S. Cl. .......... 340/172.5, 340/173
[51] Int. Cl. .......... G06f 7/28
[50] Field of Search .......... 340/172.5, 173 L, 173 LM; 353/25, 26

[56] References Cited

UNITED STATES PATENTS

| | | | |
|---|---|---|---|
| 2,994,072 | 7/1961 | Woody, Jr. | 340/173 X |
| 2,782,398 | 2/1957 | West et al. | 340/172.5 X |
| 3,252,143 | 5/1966 | Sundblad | 340/172.5 |
| 3,541,339 | 11/1970 | John et al. | 353/26 X |
| 2,970,292 | 1/1961 | Kliever | 340/172.5 |
| 3,036,291 | 5/1962 | Whittle et al. | 340/172.5 |
| 3,144,637 | 8/1964 | Adams et al. | 340/172.5 |
| 3,191,006 | 6/1965 | Avakian | 340/172.5 X |

*Primary Examiner*—Gareth D. Shaw
*Assistant Examiner*—Sydney R. Chirlin
*Attorneys*—Robert W. Hampton and R. Lewis Gable

ABSTRACT: Apparatus is disclosed for sensing and counting the number of information images disposed on an information-bearing medium such as a strip of microfilm. At least first and second rows of images are recorded on a strip of microfilm and apparatus is disclosed herein for counting marks or indicia associated with each of the information images (or frames). More specifically, the apparatus includes a first set of means disposed to sense the counting marks of the first row as the strip is moved in a first direction and to provide signals which are counted to indicate the number of images in the first row. Further, the apparatus includes a second set of means disposed to sense the counting marks in the second row as the strip is moved in a second opposite direction and to enable the apparatus to continue sequentially to count the images in the second row. In an illustrative embodiment of this invention, the first set of means may provide signals indicative of counting down the images in the first row as the strip is moved in the second direction; and the second set of means may provide signals indicative of counting down the images in the second row as the strip is moved in the first direction.

ROBERT E. CULLEN
INVENTOR.

BY R. Lewis Gable
Robert W. Hampton
ATTORNEYS

ROBERT E. CULLEN
INVENTOR.

BY R. Lewis Gable
Robert W. Hampton
ATTORNEYS

ROBERT E. CULLEN
INVENTOR.

BY R. Lewis Gable
Robert W. Hampton
ATTORNEYS

ROBERT E. CULLEN
INVENTOR.

BY R. Lewis Gable
Robert W. Hampton
ATTORNEYS

ROBERT E. CULLEN
INVENTOR.

BY R. Lewis Gable
Robert W. Hampton
ATTORNEYS

ROBERT E. CULLEN
INVENTOR.

BY A. Lewis Gable
Robert W Hampton
ATTORNEYS

ROBERT E. CULLEN
INVENTOR.
BY
ATTORNEYS

ROBERT E. CULLEN
INVENTOR.

BY R. Lewis Gable
Robert W Hampton
ATTORNEYS

PATENTED DEC 21 1971

3,629,840

SHEET 09 OF 10

ROBERT E. CULLEN
INVENTOR.

BY R. Lewis Gable
Robert W Hampton
ATTORNEYS

ROBERT E. CULLEN
INVENTOR.

BY R. Lewis Gable
Robert W. Hampton
ATTORNEYS

APPARATUS FOR SENSING AND COUNTING IMAGES DISPOSED ON INFORMATION-BEARING MEDIA

CROSS-REFERENCES TO RELATED APPLICATIONS

Reference is made to commonly assigned copending application Ser. No. 863,223, entitled "Indicia Marking Mechanism For Photographic Copying Apparatus," filed Oct. 2, 1969, in the names of Altmann and Calico; to commonly assigned copending application Ser. No. 31,476, entitled "Apparatus for sensing and Counting Images Disposed on Information Recording Media," filed Apr. 24, 1970, in the names of William C. Ferenchak and Ronald A. Phillips; and to commonly assigned copending application Ser. No. 31,474, entitled "Apparatus for Sensing and Counting Images Disposed on Information Bearing Media," filed Apr. 24, 1970, in the name of Robert E. Cullen.

BACKGROUND OF THE INVENTION

1. Field of the Invention

This invention relates to apparatus for scanning and accessing a selected image from a plurality of images, and more particularly to apparatus for counting the number of images scanned and for providing a suitable manifestation or signal when the desired or selected number of images have been counted.

2. Description of the Prior Art

The use of microfilm to store great numbers of images or frames of information is well known in the art. Typically, an extended length of a strip of microfilm is used to record photographically images thereon of documents or other suitable information. The processed strips of microfilm provide a suitable information storage media which may be wound in a roll and stored in a suitable cartridge or magazine until it is desired to display or reproduce one of the recorded images. The retrieving or accessing of a desired frame or image of information may be accomplished by inserting the roll of microfilm into a suitable viewer and of directing the strip of microfilm through the microfilm viewer while the operator observes the images being displayed upon the screen of the viewer. When the desired image has been found by the operator, he may observe at length or may make a copy of the accessed image. The described process of finding a selected image is tedious and requires an inordinate amount of time to be spent by the operator to observe images displayed upon the viewer screen.

One method of decreasing the time to access a desired frame or image of information, is to provide suitable apparatus which row is being scanned and also the direction in which the row is being scanned to thereby correctly count up or count down in that particular row. As a result, the apparatus is capable of counting upward or downward the images of either of the first or second rows depending upon the direction in which the strip of microfilm is being directed. In an illustrative embodiment of this invention, the apparatus senses and counts the images in the first row in an upward direction as the film strip is moved in a first or unwinding direction and to continue to count the images in the second row in an upward direction as the strip of microfilm is being transported in a second direction opposite to the first direction.

SUMMARY OF THE INVENTION

In a specific illustrative embodiment of this invention, the apparatus includes first and second radiation-sensitive devices such as photocells for sensing the images in the first row, and a third and fourth radiation sensitive devices for sensing the images in the second row. Control or interpretation means respond to the presence of signals derived from the first and second device and to the absence of the signal from the second device at a previous point in time, and to the presence of signals from the third and fourth devices and the absence of the signal from the third device at a previous point in time to provide countup manifestations. In an analogous manner, the control means responds to certain signals derived from the radiation-sensitive devices to provide countdown signals. Illustratively, the interpretation means may include storage devices such as flip-flops to provide signals indicative of the previous signals produced by the radiation-sensitive devices, and coincidence gates for detecting the simultaneous presence and/or absence of signals from the radiation-sensitive devices to provide manifestations of either counting down or up.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawing in which.

DESCRIPTION OF THE PREFERRED EMBODIMENT

Figure 1:
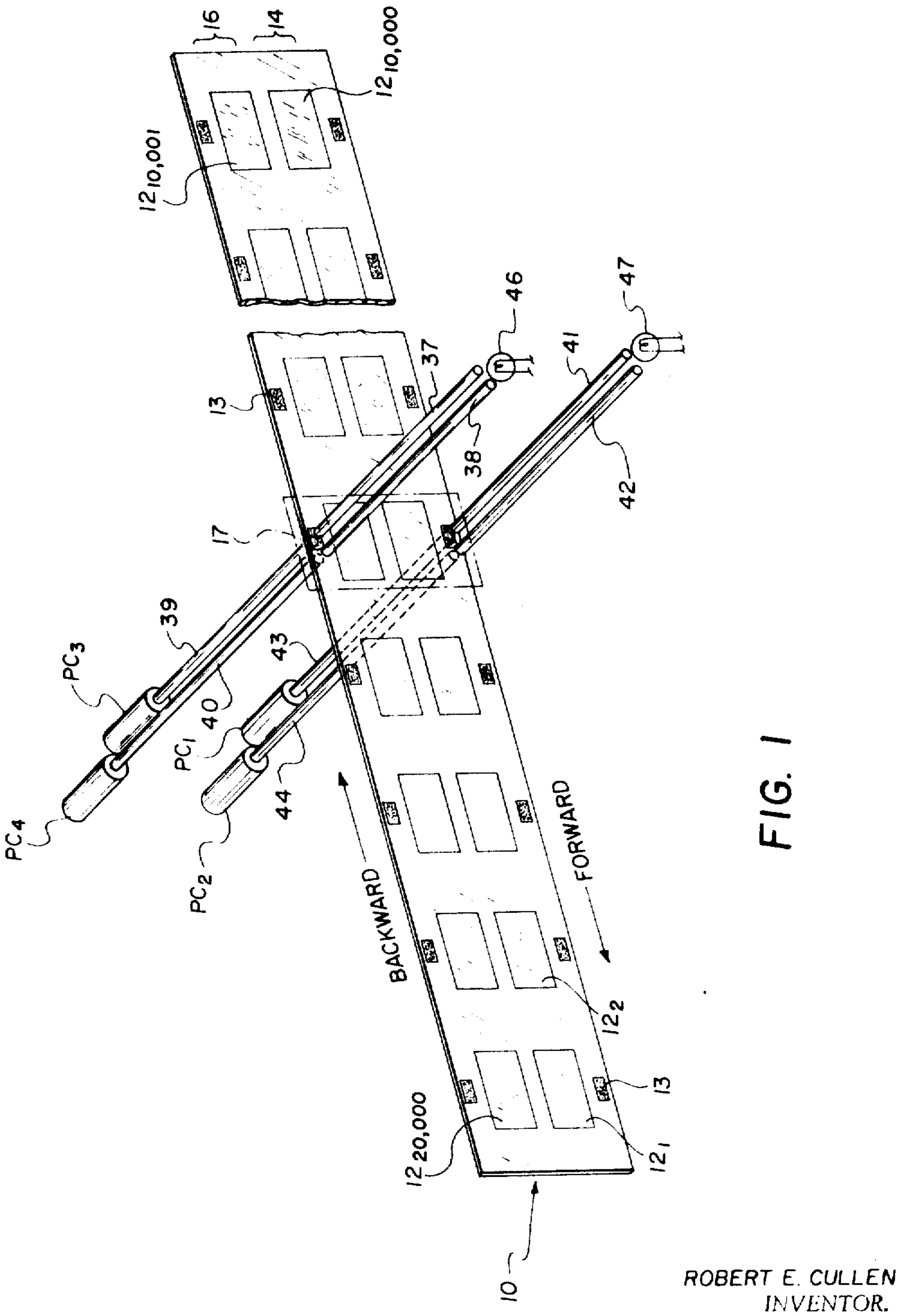
FIG. 1 is a perspective view of a strip of microfilm having recorded thereon first and second rows of information images and apparatus for sensing and providing a manifestation of the indicia or marks associated with each of the frames or images recorded thereon.

With reference now to the drawings and in particular to FIG. 1, there is shown a strip 10 of an information-bearing medium such as microfilm having recorded thereon a plurality of images 12. The images 12 are arranged in a first (bottom or standard) row 14 and in a second (top or duo) row 16. In the illustrated embodiment, the strip 10 of microfilm may have 20,000 images 12 recorded thereon and the encoding number of the image 12 is indicated by a subscript. As shown in FIG. 1, the first image in row 14 is designated $12_1$ and the last image in row 14 is designated $12_{10,000}$; in a similar fashion, the first image in row 16 is designated $12_{10,001}$, whereas the last image in row 16 is designated $12_{20,000}$. Further, a plurality of indicia or counting marks 13 are disposed in a fixed relationship with respect to each of the images 12. In particular, the counting marks 13 are disposed in fixed relationship with respect to the leading edge of corresponding image 12 and located between the rows of images 12 and the longitudinal edges of the strip 10. Illustratively, the images 12 and the marks 13 may be photographically recorded on a strip 10 of microfilm by the apparatus described in the copending U.S. Pat. application referred to above in the names of Altmann and Calico.

In accordance with the teachings of this invention, it is desired to be able to access any of the 20,000 images 12 recorded upon the strip 10 of microfilm. This is accomplished by comparing a predetermined number with the number of marks 13 which have been counted as the strip 10 of microfilm is directed past a utilization station 17. When the number of marks 13 that has been scanned and counted, equals the predetermined number, the apparatus for driving the strip 10 of microfilm will be operated to bring the strip 10 to a stop so as to place the selected image 12 at a utilization 17 in a manner similar to that described in the above-identified application entitled "Apparatus for Sensing and Counting Images on Information Bearing Media Having an Added Counting Capability."

With regard to FIG. 1, there is shown as assembly made up of photocells $PC_1$ and $PC_2$, and $PC_3$ and $PC_4$ for detecting respectively the passage of the counting marks 13 associated with the images of the rows 14 and 16. More specifically, a suitable source 47 of radiation is disposed to direct radiation through conduits 41 and 42 made of a suitably radiation-transmissive material such as plastic materials sold by DuPont Co. under the trademark Crofton. The radiation conduits 41 and 42 are disposed so that the radiation emitting from the end of the radiation conduits 41 and 42 will be intermittently intercepted by the counting marks 13 associated with the images 12 of the lower row 14. A second pair of radiation conduits 43 and 44 is disposed to receive the radiation emanating from the ends of the radiation conduits 41 and 42 respectively. The radiation transmitted through the radiation conduits 43 and 44 is directed onto the radiation-sensitive portions of photocells $PC_1$ and $PC_2$ respectively. In an illustrative embodiment of this invention, the photocells $PC_1$ and $PC_2$ may take the form of phototransistors. In a manner similar to that described above, a source 46 of radiation is disposed to direct radiation through the radiation conduits 37 and 38 so as to be intercepted by the marks 13 associated with the images 12 of the second or duorow 16. The radiation transmitted through the strip 10 of microfilm is coupled by a pair of radiation conduits 39 and 40 to a second pair of photocells $PC_3$ and $PC_4$. It may be understood that a single radiation conduit may replace the pair of conduits 41 and 42 (or 37 and 38) to transmit the radiation from the source 47 (or 46) to the strip of microfilm 10. The photocells $PC_1$, $PC_2$, $PC_3$, and $PC_4$ receive pulses of radiation from the radiation conduits as the counting marks 13 are directed thereby. This intermittent "covering" and "uncovering" of the radiation conduits generates the radiation pulses that are sensed by the photocells $PC_1$, $PC_2$, $PC_3$ and $PC_4$ which in turn provide a manifestation (or signal) in the form of electrical pulses to indicate the passage of the counting marks 13. The manner in which each of the pairs of photocells $PC_1$, $PC_2$, $PC_3$ and $PC_4$ operate to sense the passage of a counting mark 13 will be explained later in detail.

Figure 12:
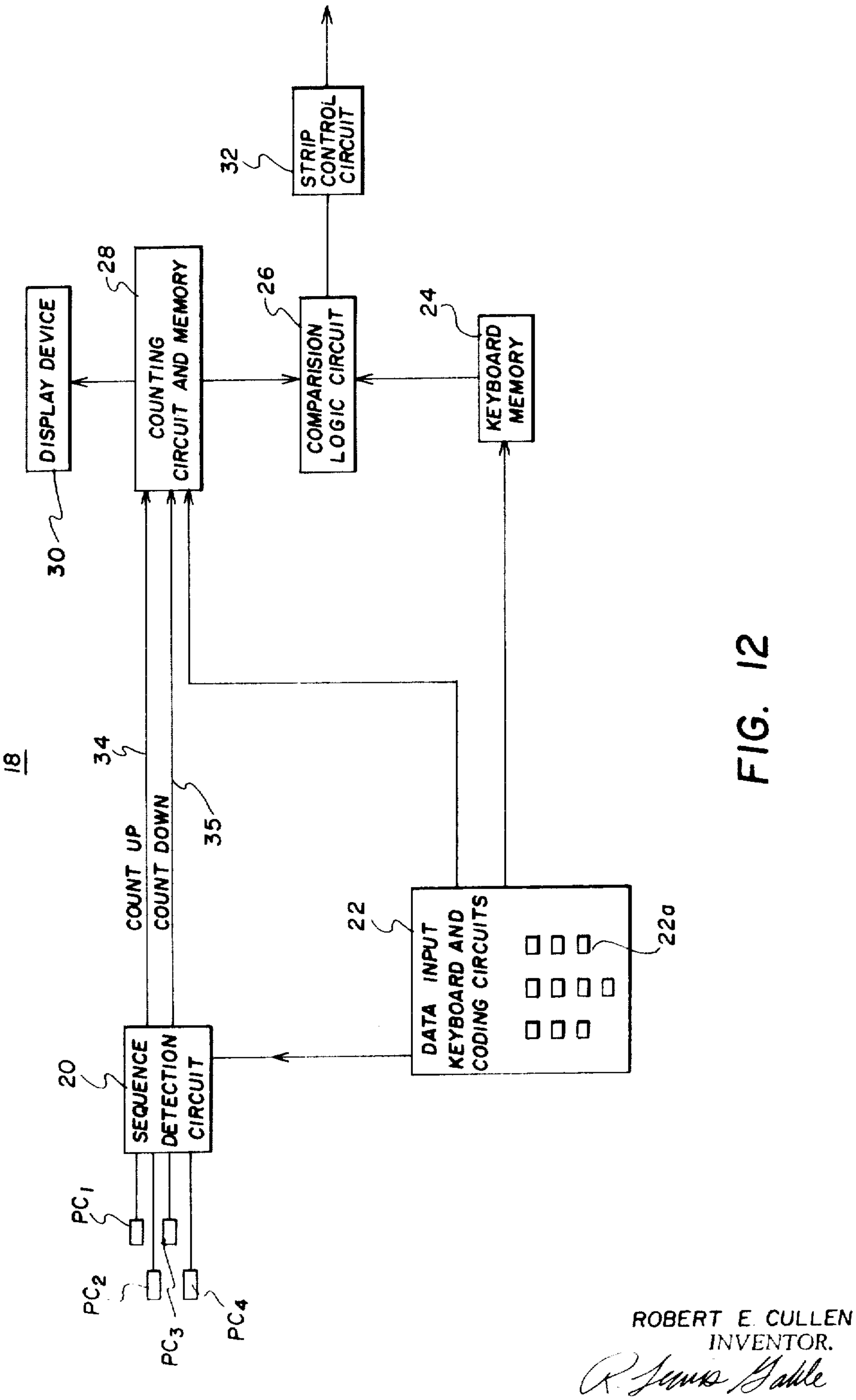
FIG. 12 shows a diagrammatic representation of the circuit for sensing the signals provided by the photocells $PC_1$, $PC_2$, $PC_3$, and $PC_4$ and for processing the signals in order to control the movement of the strip of microfilm.

With regard to FIG. 12, there is shown diagrammatically the operation of a control circuit 18 for receiving the signals generated by the photocells $PC_1$, $PC_2$, $PC_3$ and $PC_4$ and for controlling the accessing of the selected image from the strip 10 of microfilm. First the operator will enter as by keys 22*a* of a data input keyboard and coding circuit 22 the desired number of the image to be retrieved from those recorded on the strip 10 of microfilm. A signal generated by the data input keyboard coding circuit 22 is applied to a keyboard memory 24 which serves to store the predetermined number for later use. In a manner to be explained later, one pair of the photocells $PC_1$, $PC_2$, $PC_3$ and $PC_4$ will supply the signals to a sequence detection circuit 20, which in turn functions to provide a signal to either of a pair of conductive paths 34 or 35 dependent upon whether a countup or countdown signal is to be generated. It is noted that in an illustrative embodiment of this invention, a suitable amplifying shaping circuit may be disposed between the photocells and the sequence detection circuit 20. As shown in FIG. 12, the conductive paths 34 and 35 are connected to a counting and memory circuit 28, which serves to count and store the successive signals applied over the conductive paths 34 and 35. Thus, as successive counting marks 13 are sensed, the counting and memory circuit 28 will serve to count and store the number of counting marks so sensed.

As will be explained later, the operation of the sequence detection circuit 20 depends upon which row 14 or 16 of images 12 is being counted, the type of strip 10 that is being sensed, i.e., whether the strip 10 is positive or negative microfilm, and in which direction the strip 10 is being moved. The number of the images 12 counted and stored on the circuit 28 is indicated by a display device 30. Typically, the display device 30 may be made up of a plurality of decade display devices corresponding to the number of decades in the memory of the circuit 28. Thus, an operator may readily see upon the display device 30 the number of images 12 that have been sensed and counted by the control circuit 18. As shown in FIG. 12, signals indicative of the number stored upon the keyboard memory 34 and upon the counting and memory circuit 28 are applied to a comparison logic circuit 26 which serves to compare the numbers stored on the counting circuit and memory 28 and the keyboard memory 24. When the comparison logic circuit 26 senses a coincidence between these two numbers, a signal will be generated by the circuit 26 and applied to a strip control circuit 32 to thereby indicate that the preselected number of marks 13 and therefore images 12 have been counted. The strip control circuit 32 may operate in a manner similar to that described in U.S. Pat. No. 3,290,987 to bring the strip 10 of microfilm to a halt and to position the selected image 12 at the utilization station 17. As will be explained, the utilization station 17 may take the form of a strip feed guide 121, which may be incorporated into a microfilm reader or display device.

Figures 14A, 14B:
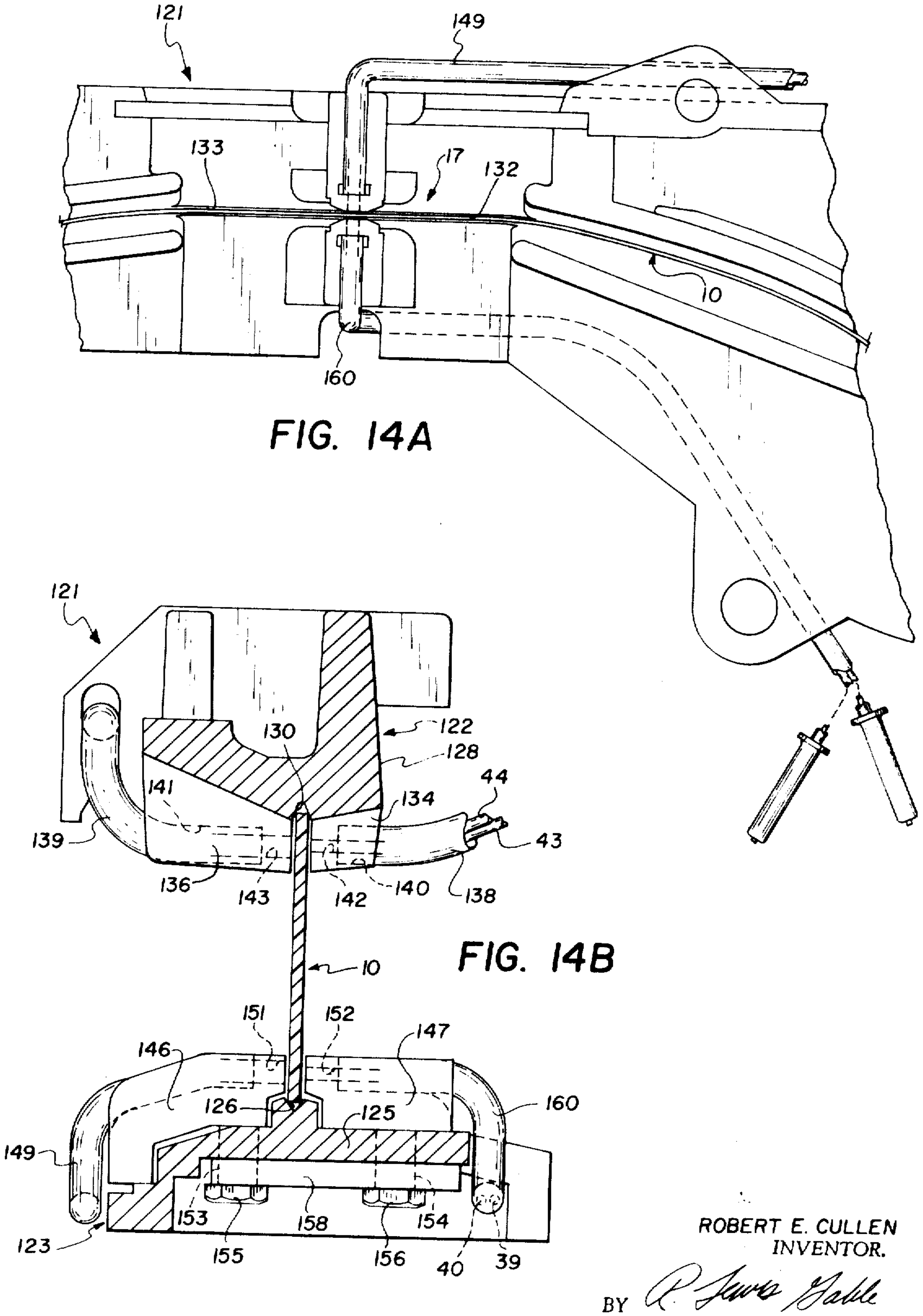
FIGS. 14A and 14B respectively show a plan view of the film gate for transporting the strip of microfilm past the photocells $PC_1$, $PC_2$, $PC_3$ and $PC_4$ and a cross-sectioned view of the film gate shown in FIG. 14A.

With reference now to FIGS. 14A and 14B, the strip feed guide 121 for receiving the strip 10 of microfilm includes a top assembly 122 and a bottom assembly 123 for receiving respectively the top and bottom edges of the strip 10. With particular reference to FIG. 14B, the bottom assembly 123 includes a bottom guide plate 125 having a V-shaped groove 126 therein for receiving the bottom longitudinal edge of the strip 10. In a similar manner, the top assembly 122 includes a gate 128 having a V-shaped groove 130 thereon for receiving the top longitudinal edge of the strip 10. As can be seen in FIG. 14A, the strip of microfilm is directed into the projection or utilization station 17 by an entrance path 132, and from the projection station 17 by an exit path 133. The radiation conduits 37 and 38 have been replaced by a single light conduit which is enclosed in a jacket 139 and is mounted upon a support member 136. More specifically, the jacket 139 is disposed within an opening 141 within the support member 136. The single light conduit extends from the jacket 139 within an opening 143 of a smaller diameter than the opening 141 so as to direct radiation onto the upper edge portion of the strip 10 so as to be intercepted by the counting marks 13 associated with the second or duorow 16. As shown in FIG. 14B, the radiation conduits 39 and 40 are enclosed within a jacket 138 which is mounted upon a support member 134. More specifically, the jacket 138 is disposed within an opening 140 and the light conduits 39 and 40 extend therefrom into an opening 142 and a second opening (not shown) of smaller diameter, to thereby receive the radiation transmitted through the upper portion of the strip 10 of microfilm. In a manner similar to that described above, the radiation conduits 43 and 44 are disposed within a jacket 160 which is mounted upon a support member 147. More specifically, the jacket 160 is disposed within an opening or passage within the member 147 and the light conduits extend from the jacket 160 respectively into an opening 152 and a second opening (not shown) of smaller dimension than the aforementioned passage. The light conduits 41 and 42 shown in FIG. 1 are replaced by a single conduit wrapped in a jacket 149 and mounted in an opening within a support member 146. The single conduit extends from the jacket 149 and is disposed within an opening 151 so as to position the single radiation conduit to transmit radiation from the source 47 through the lower portion of the strip 10 so as to be intercepted by the counting marks 13 associated with the images 12 of the first row 14. As shown in FIG. 14B, the support members 146 and 147 are adjustably disposed with respect to the bottom assembly 123. More specifically, threaded members 153 and 154 are disposed through the support members 146 and 147 and are adjustably secured to the bottom assembly 123 by bolts 155 and 156 respectively. As a result, the precise alignment between the conduits 43, 44 and the single conduit associated with the source 47 of radiation and the counting marks on the strip 10 may be precisely adjusted.

With regard to FIG. 12, this invention primarily relates to the operation of the sequence detection circuit 20 which is connected to the photocells $PC_1$, $PC_2$, $PC_3$ and $PC_4$. More specifically, the function of the sequence detection circuit 20 is dependent on the manifestations or signals derived from the photocells to determine when to count up and when to count down. In order to understand the logic rules for producing the particular countup or countdown signals, the case where the strip 10 is negative and the photocells $PC_1$ and $PC_2$ are operative to sense the first row 14 of images 12, will be considered. In this instance, it is desired to count on an opaque mark 13 and the count should increase as the strip is moved out of the storage magazine in a forward or first direction as indicated in FIG. 1. The counting of an opaque mark 13 suggests that a count should be registered when an opaque mark intercepts the radiation directed onto both of the photocells $PC_1$ and $PC_2$, in other words, when both of the photocells PC , and $PC_2$ are covered effectively by a single mark 13. However, the counting marks 13 can be comparatively wide and if the counting operation was effected at one edge of the mark 13 when approaching from the second direction, the corresponding image 12 may not be properly aligned with the utilization or projection station 17. This problem can be resolved by looking for or detecting with the photocells only one edge of the marks 13 viz, the leading edge of the mark 13 when the strip is being moved in a forward direction and the trailing edge of the mark 13 when the strip 10 is being moved in the backward direction.

Figure 2A:
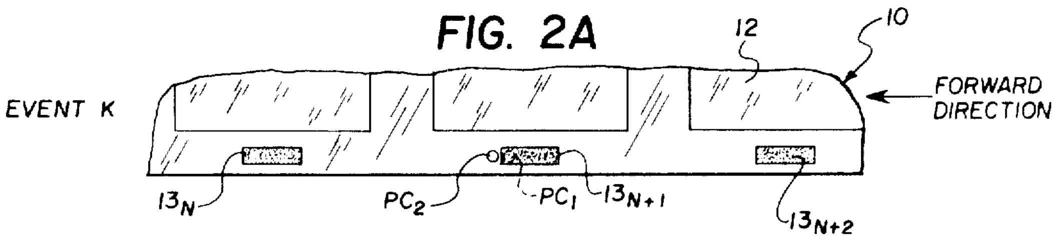
FIGS. 2A and 2B show respectively the relationship of the marks associated with each of the images of the first or bottom row with respect to the sensing apparatus as the strip of microfilm is moved in a first or forward direction.
Figure 2B:
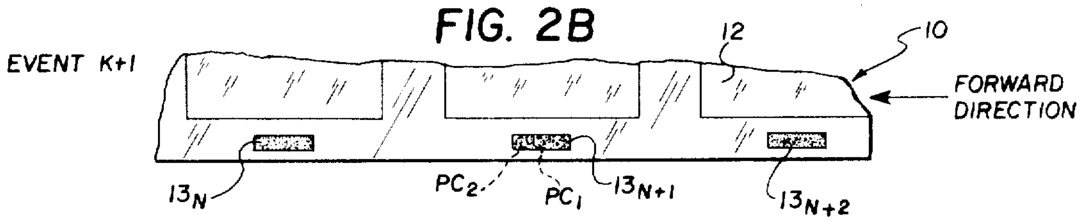

With reference to FIG. 2A, the front edge of the mark $13_{N+1}$ is best determined by having photocell $PC_1$ covered by the mark $13_{N+1}$ and the photocell $PC_2$ covering or coincident with the clear portion of the strip hd in front of the mark $13_{NH+1}$. However, if only this condition was relied on to sense the counting of a mark, any speck of dirt or scratch on the strip 10 could possibly indicate a false counting since it will appear to the photocell $PC_1$ as the front edge of the mark 13. In accordance with the teachings of this invention, this problem is resolved by providing a manifestation (or signal) of a count at event K+1 when both photocells $PC_1$ and $PC_2$ cover a single mark $13_{N+1}$ as seen in FIG. 2B. If the strip is being moved in a forward direction a signal or manifestation of a count is derived when both of the photocells $PC_1$ and $PC_2$ are moved into optical alignment with or are covered by a single mark 13. If the strip is being moved in a backward direction as shown in FIG. 3B, a count signal is derived when the photocell $PC_2$ has been uncovered by the trailing edge of the mark 13. In both of these cases, no signal or manifestation of a count will occur unless the marks 13 are sufficiently long to cover both photocells $PC_1$ and $PC_2$ simultaneously. In addition, the manifestation of a count for both of these cases will occur very close to the same point on the mark 13 and also on the corresponding image 12.

Figure 13A:
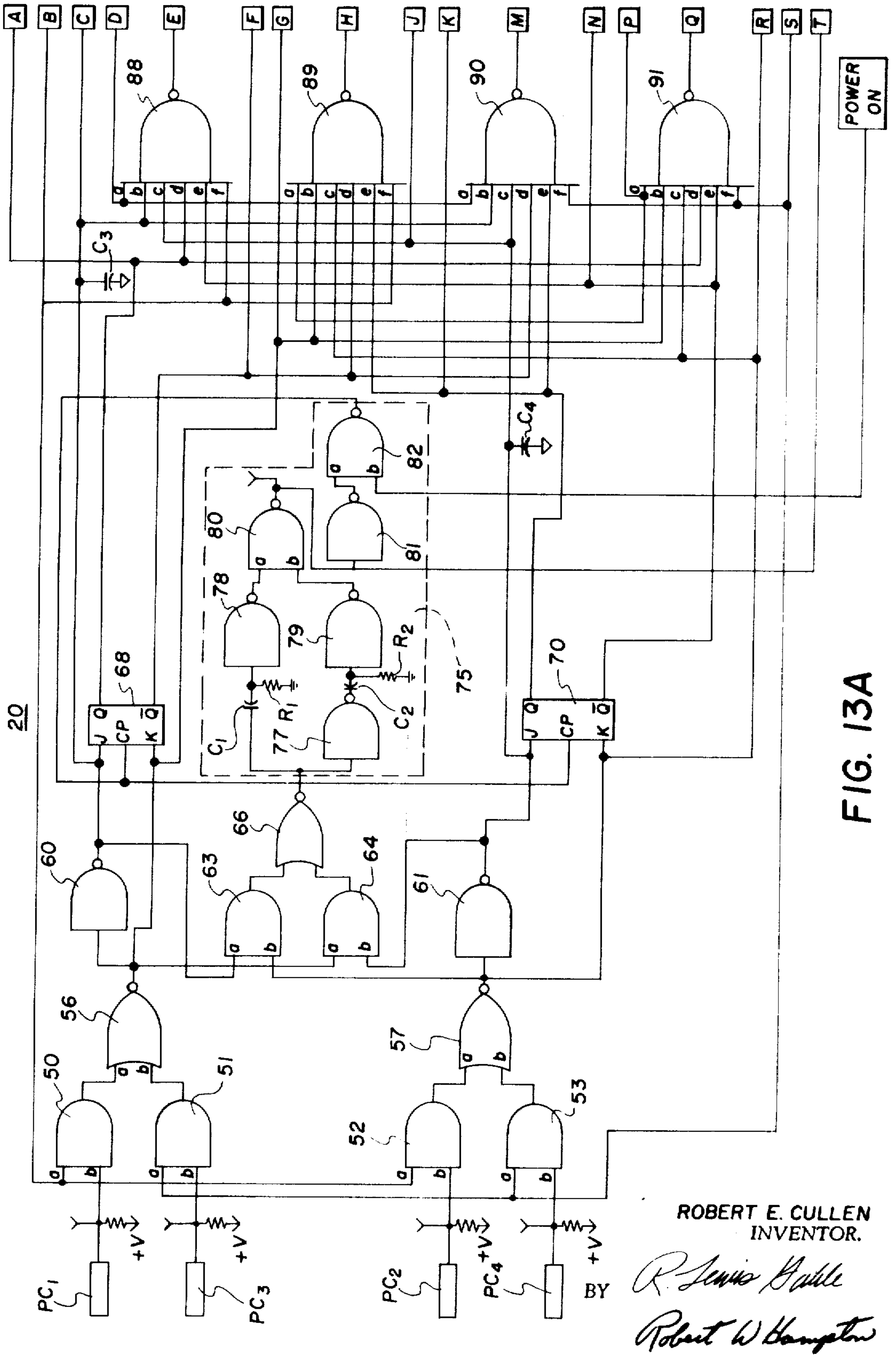
FIGS. 13A and 13B show schematically the circuit arrangement of a specific embodiment of the sequence and detection circuit shown in FIG. 12.
Figure 13B:
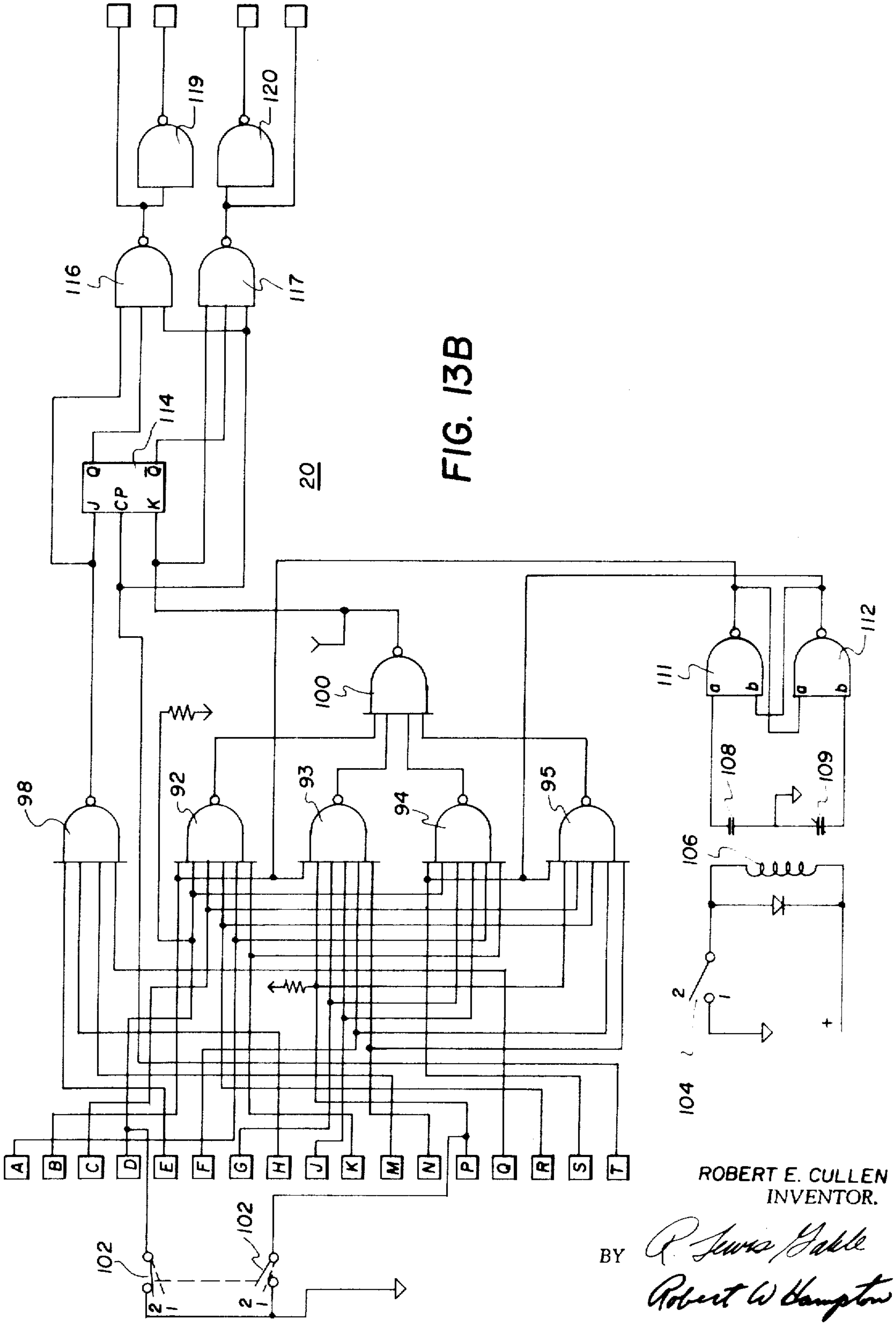

In order to facilitate the understanding of the operation of the circuit shown in FIGS. 13A and 13B and also to simplify the discussion of the relationships between the photocells and the counting marks 13, the following nomenclature will be adopted:

1. PC−1 is the logic state or condition of photocell $PC_1$ as a logical "1," i.e., the indicent radiation on the photocell $PC_1$ generates the signal above a given value, e.g. +2.4 v., when the photocell $PC_1$ is opposite an opaque counting mark 13, and the condition of photocell $PC_1$ as a logical "0" when the photocell $PC_1$ is opposite a clear portion of the strip 10, i.e., the incident radiation of the photocell $PC_1$ causes the photocell $PC_1$ to assume a potential less than a given value, e.g. 0.8 v.

2. $\overline{PC-1}$ is the logic state or condition of the photocell $PC_1$ as a logical "0" when it is opposite an opaque counting mark 13 and its state as a logical "1" when the photocell $PC_1$ is opposite a clear portion of the strip 10.

It is noted that these definitions remain the same under all circumstances which may occur and is not dependent on whether a positive or negative strip 10 is used, or whether the first or second row 14 or 16 is being scanned. Similarly, the notations PC−2, $\overline{PC-2}$ apply to the corresponding states of the photocell $PC_2$, and analogous notation is adopted for the similar logic conditions or states of the photocells $PC_3$ and $PC_4$.

In order to determine if the strip 10 is going in a first or forward, or a second or backward direction, the sequence of the states of the various photocells must be examined and this requires a memory or a storage of the previous states of the photocells. Therefore, the following definitions will apply to previous events or states of the photocells:

1. PC−1′ is the logic state or condition of the photocell $PC_1$ as a logical "1" when the photocell $PC_1$ was opposite an opaque counting mark 13 at the conclusion of the event just prior to the present event, and is a logical "0" if the photocell $PC_1$ was opposite a clear portion of the strip at the conclusion of the event just prior to the present event.

2. $\overline{PC-1'}$ is the logic state or condition of photocell $PC_1$ as a logical "0" when the photocell $PC_1$ is opposite an opaque counting mark 13 at the conclusion of the event just prior to the present event, and is a logical one when it is opposite a clear portion of the strip 10 at the conclusion of the event just prior to the present event.

PC−2′ and $\overline{PC-2'}$ are defined in a similar manner to PC1′ and PC1′ with the obvious exception that these terms apply to the logic conditions or states of the photocell $PC_2$. It is particularly noted that an event as used in these definitions, is defined as the covering or uncovering of a photocell by an opaque or dark portion of the strip 10.

In accordance with the teachings of this invention, it is desired to provide a signal or manifestation of a countup when the photocells $PC_1$ and $PC_2$ are opposite or are aligned with the opaque counting marks 13 as shown in FIGS. 2A and 2B, provided that at the prior event, photocell $PC_2$ was opposite a clear portion of the strip 10. This statement for a countup signal applies for a strip of negative film that is being scanned in a forward direction on the first or standard row 14 of images and is tentative statement of the required conditions subject to other events which will be explained later. Reference is made to FIGS. 2A and 2B which shows the conditions of events K and K+1 tentatively required for a countup signal. If at event K photocell $PC_1$ is covered and at event K+1 both photocells $PC_1$ and $PC_2$ are covered, a tentative countup signal will be provided. In Boolean notation, the conditions for a tentative countup signal may be expressed as follows:

$$\text{Tentative Countup} = PC\text{-}1 \cdot PC\text{-}2 \cdot \overline{PC\text{-}2'} \quad (1).$$

The sequence shown in FIGS. 2A and 2B is the only possible sequence of events that can produce the logic states PC−1, PC−2 and $\overline{PC-2'}$ simultaneously; as a result when these events occur together, there is a positive indication that the strip 10 is moving in a forward direction and that the photocells $PC_1$ and $PC_2$ have just run onto the front edge of a counting mark 13.

Figure 3A:
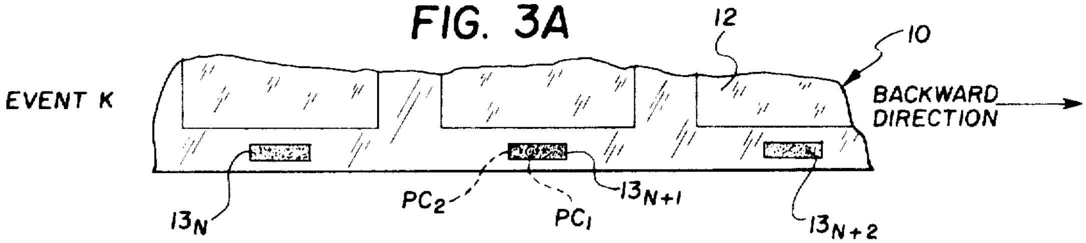
FIGS. 3A and 3B show the relationship of the marks associated with the first or bottom row of images with respect to the sensing apparatus as the strip is moved in a second or backward direction.
Figure 3B:
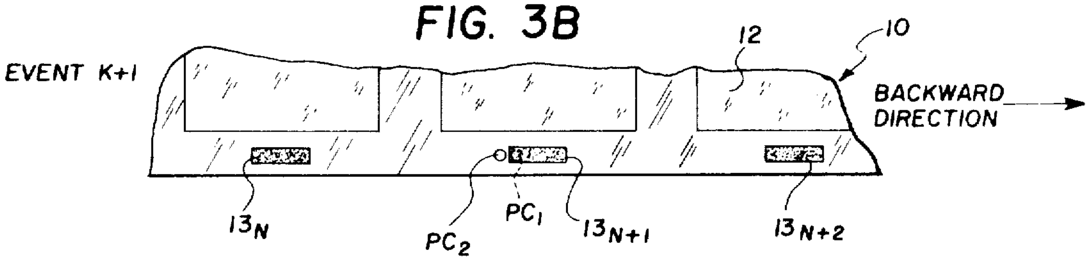

With reference to FIGS. 3A and 3B, the events necessary to provide a tentative countdown signal are shown. In the situation where the first or standard row 14 of a negative strip 10 is being scanned, a tentative countdown signal will be provided at event K+1 when the photocell $PC_2$ is opposite a clear area of the strip 10 and the photocell $PC_1$ is opposite an opaque counting mark 13 on the previous event K. Therefore, at event K+1, the sequence and detection circuit 20 which sense the signals received from the photocell will generate a tentative countdown signal. In Boolean notation, the conditions for a tentative countdown signal may be expressed as follows:

$$\text{Tentative Countdown} = PC\text{-}1 \cdot \overline{PC\text{-}2} \cdot PC\text{-}2' \quad (2).$$

The events illustrated in FIGS. 3A and 3B are the only ones which can produce the signal simultaneously, so that upon a simultaneous occurrence of these events, a suitable signal is generated to tentatively indicate that the strip 10 is moving backwards and that the photocells are at the front edge of an opaque counting mark 13.

Figure 4A:
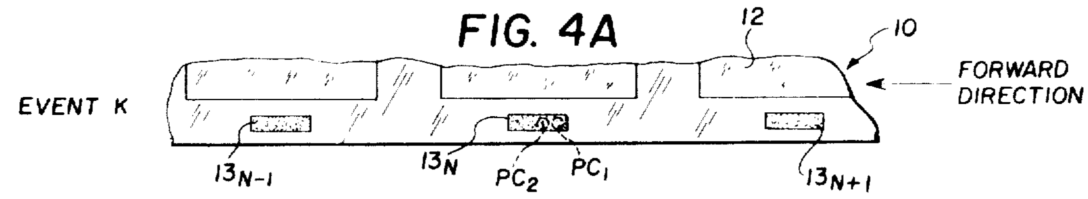
FIGS. 4A, B, C and D demonstrate the effect of a reversal of direction of the strip of microfilm upon deriving an indication of the correct of images which have been scanned.
Figure 4B:
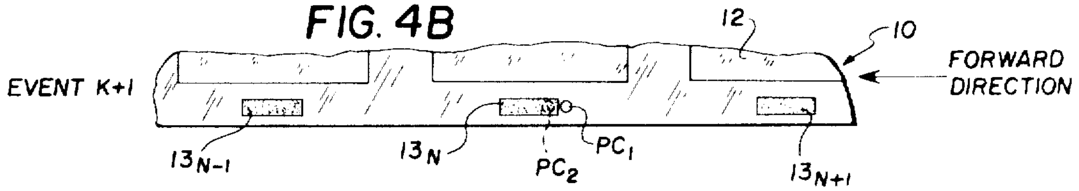
Figure 4C:
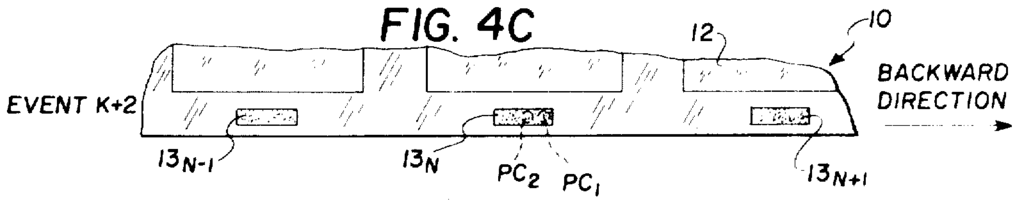
Figure 4D:
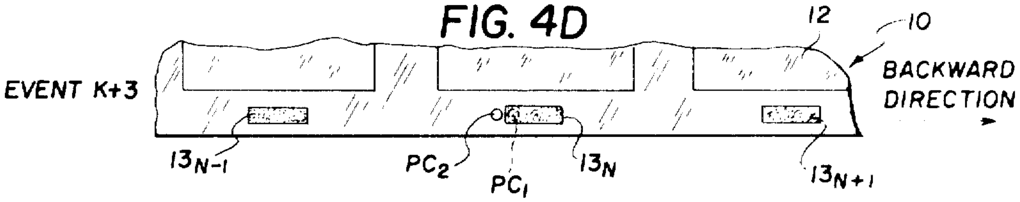

In definitions given above, the conditions under which the countdown and countup signals are generated, the word tentatively has been used for the reason that there are exceptions to the described situations. The exception occurs when the strip 10 of microfilm is stopped and directed in the other direction with the result that the next indicated count should be disregarded. To understand this more completely, reference is made to FIGS. 4A, B C, and D wherein the strip 10 is moved first in a forward direction during events K and K+1, and then moved in a backward direction for events K+2 and K+3. It is noted that during these four events, the image being disposed at the projection or utilization station 17 is the same and correspondingly, that the number indicated upon the display device 30 should be the same for each of the four events. However, at event K+3 the signals PC-1, PC-2 and PC-2' occur simultaneously which would provide a tentative countdown signal. However, if a countdown signal is generated, the display device 30 would incorrectly indicate that the image N-1 was disposed at the utilization station 17. Therefore, whenever the strip 10 changes direction, the next count should be ignored.

In order to account for the situation in which the strip 10 is reversed, a signal manifestation indicative of a count in a given direction may be provided only when a subsequent count in the same direction has been produced prior to the count in that same direction. In other words, a subsequent count signal has to be in the same direction as the previous count signal in order to produce an output signal indicative of a count in that direction.

In order to expedite the further discussion of this invention, the following logic signals will be defined:

1. CU1 is a logical "1" when the photocells generate the proper sequence of signals for a tentative countup. As defined above in equation for a strip 10 of negative film being scanned on its first row 14, $CU1=PC\text{-}1 \cdot PC\text{-}1 \cdot \overline{PC\text{-}2'}$.

2. CD1 is a logical "1" when the signals derived from the photocells indicate a proper sequence for a tentative countdown signal. As defined above in equation 2 for a negative strip 10 being scanned on its first row 14, $CD1=PC\text{-}1 \cdot \overline{PC\text{-}2} \cdot PC\text{-}2'$.

3. CU2 is a logical "1" if a CU1 has occurred more recently than a CD1.

4. CD2 is a logical "1" if a CD1 has occurred more recently than a CU1.

Thus, in the terms defined above COUNTUP and COUNTDOWN signals may be defined in Boolean notation as follows:

$$COUNTUP = CU1 \cdot CU2 \quad (3)$$

$$COUNTDOWN = CD1 \cdot CD2 \quad (4)$$

Figure 5A:
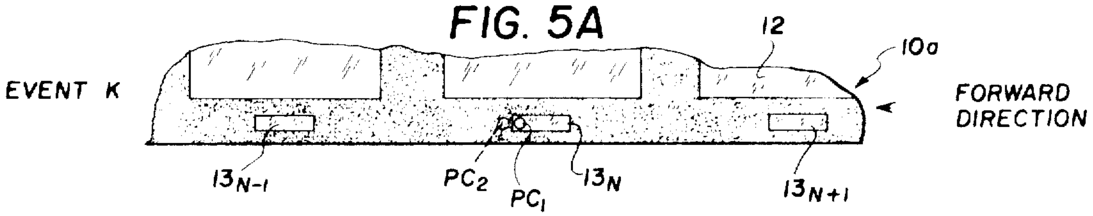
FIGS. 5A and B and FIGS. 6A and B show the sensing and counting of a strip of positive microfilm having clear or positive marks associated with images recorded thereon, in a forward and a backward direction, respectively.
Figure 5B:
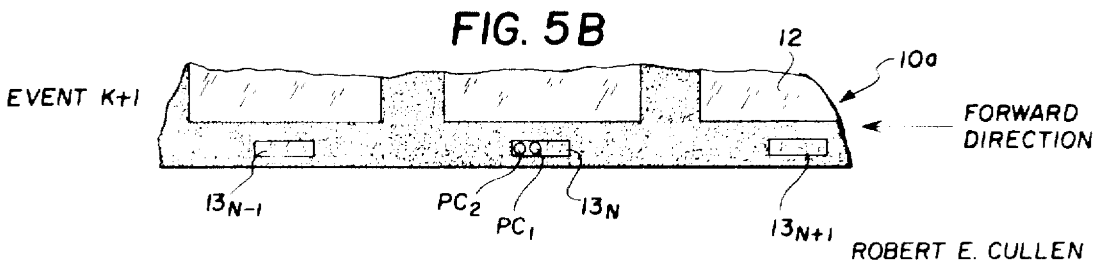

In FIGS. 5A and 5B, the strip 10 of negative film has been replaced with a strip 10*a* of positive film. The conditions and states of the respective photocells will now be discussed with regard to the positive filmstrip where the counting marks 13 are clear of the strip 10*a*. In this instance, it will be desired to count on the clear or nonopaque portion of the strip 10*a*. In a manner analogous to that described above, the following rules for providing tentative countup and countdown manifestations may be developed:

$$\text{Tentative Countup } (CU1) = \overline{PC\text{-}1} \cdot \overline{PC\text{-}2} \cdot PC\text{-}2' \quad (5)$$

With regard to FIGS. 5A and 5B, it may be seen at event K+1 that photocells $PC_1$ and $PC_2$ are opposite a clear portion of the strip 10 to indicate a $\overline{PC\text{-}1}$ and a $\overline{PC\text{-}2}$ conditions. FIG. 5A, shows that the photocell $PC_2$ on the previous event was opposite an opaque portion of the strip 10*a* and a PC2' state would be indicated. As a result, the terms of equation 5 are satisfied and at event K+1 a tentative countup signal for a strip 10*a* of a positive film is provided. Following an analogous development, the tentative countdown signal for a positive filmstrip 10*a* is indicated in Boolean notation as follows:

$$\text{Tentative Countdown } CD1 = \overline{PC\text{-}1} \cdot PC\text{-}2 \cdot \overline{PC\text{-}2'} \quad (6)$$

Figure 6A:
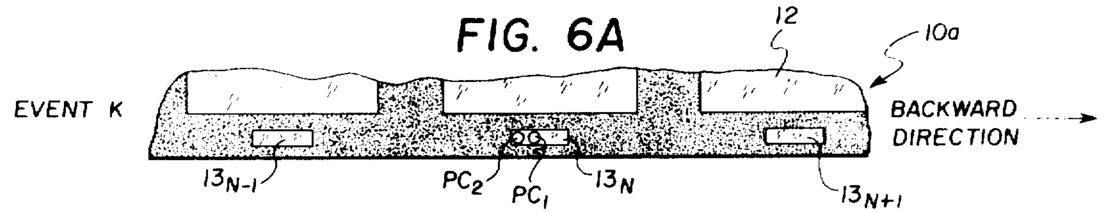
Figure 6B:
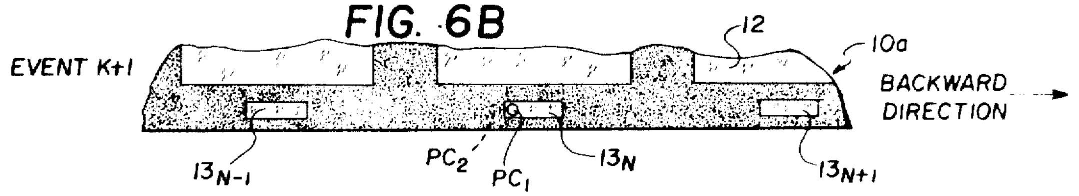

With regard to FIGS. 6A and 6B, it may be seen that the terms of equation 6 for a strip 10*a* of positive film are satisfied at event K+1, where the states of the photocells are $\overline{PC\text{-}1}$, PC-2 and $\overline{PC\text{-}2'}$.

With respect to FIG. 1, the counting of the second or duorow 16 of images 12 is reversed. In other words, the strip 10 moves out of its magazine or container to countdown and the strip 10 moves into the magazine to countup. In a manner similar to that described above, the following equation in Boolean notation is indicative of a tentative countup signal for strip 10 of negative film whose second row 16 is being scanned:

$$\text{Tentative Countup } (CU1) = PC\text{-}3 \cdot PC\text{-}4 \cdot \overline{PC\text{-}3'} \quad (7)$$

Figure 7A:
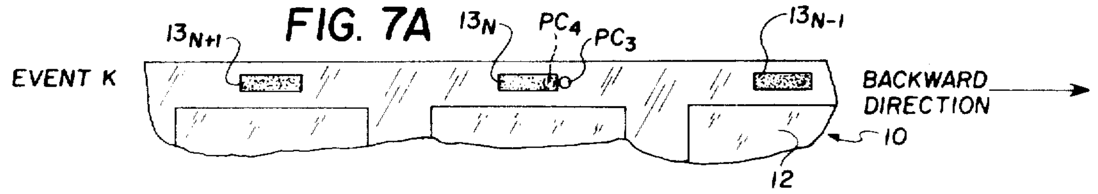
FIGS. 7A, 7B, 8A, 8B, 9A, 9B, 10A and 10B illustrate the sensing and counting of the marks associated with the top or second row of images as the strip of microfilm is directed in forward and backward directions.
Figure 7B:
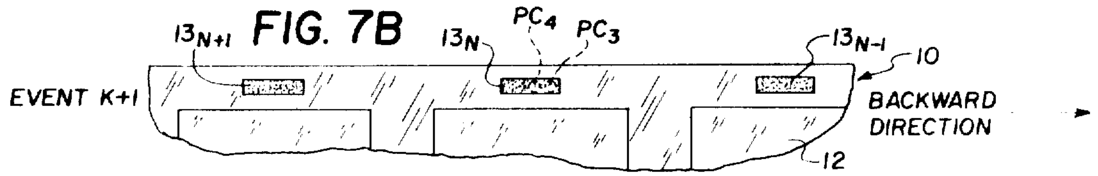

With regard to FIGS. 7A and 7B, it may be seen that the terms of equation 7 are satisfied at event K+1 where the photocells $PC_3$ and $PC_4$ are opposite the opaque counting mark $13n$, and for the previous event K, the photocell $PC_3$ was opposite a clear portion of strip 10. The following equation represents those conditions which are necessary to generate a tentative countdown signal for a strip of negative film whose second row 16 is being scanned:

$$\text{Tentative Countdown } (CD1) = \overline{PC\text{-}3} \cdot PC\text{-}4 \cdot PC\text{-}3' \quad (8)$$

Figure 8A:
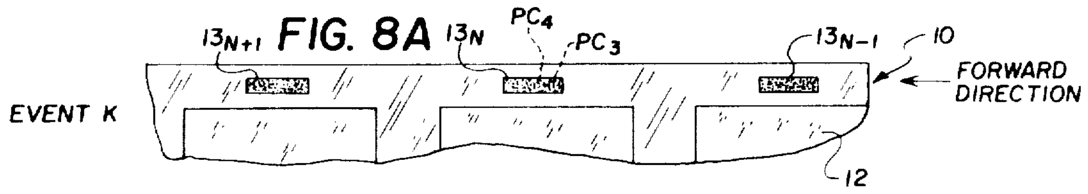
Figure 8B:
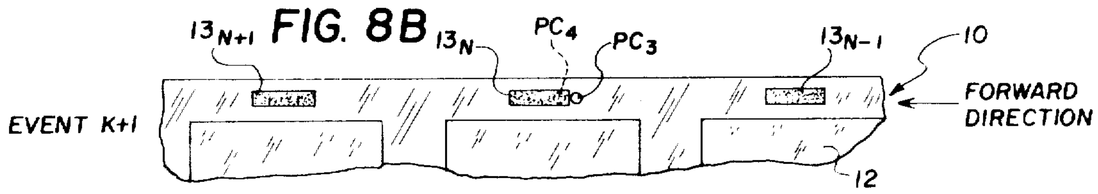

With regard to FIGS. 8A and 8B, it can be seen that at event K+1, the terms of equation 8 are satisfied, where the photocell $PC_3$ is adjacent a transparent portion of the strip 10, the photocell $PC_4$ is covered by an opaque counting mark $13_n$, and the previous event K, the photocell $PC_3$ was adjacent or covered by the opaque counting mark $13_n$.

For a strip 10*a* of positive film, the following equation represents those conditions which have to be met to indicate a tentative countup signal when the second row 16 of images is being scanned:

$$\text{Tentative Countup } (CU1) = \overline{PC\text{-}3} \cdot \overline{PC\text{-}4} \cdot PC\text{-}3' \quad (9)$$

Figure 9A:
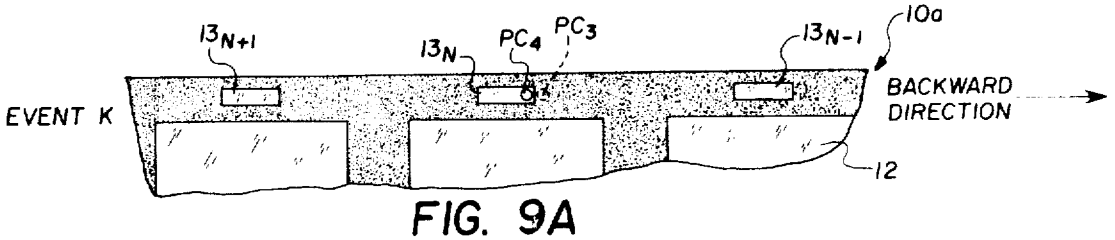
Figure 9B:
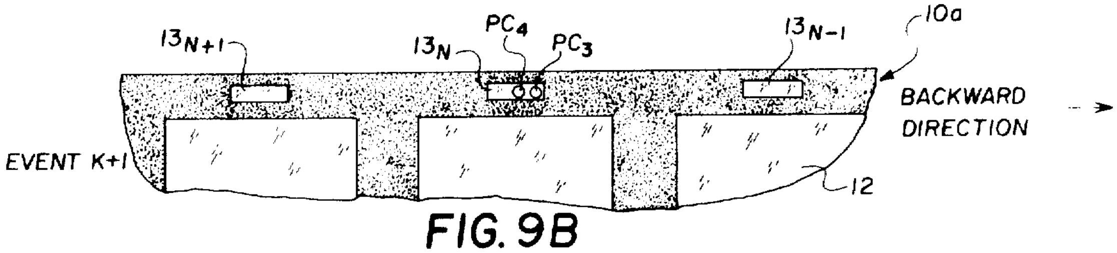

With regard to FIGS. 9A and 4it may be seen that the terms of equation are met at event K+1 to provide a tentative countup manifestation. More specifically, both of the photocells $PC_4$ and $PC_3$ are coincident at event K+1 with a clear portion of the strip 10*a* and on the previous event K, the photocell $PC_3$ was covered by an opaque portion of the strip 10*a*, In order to countdown for a strip 10*a* of positive film whose second or duorow 16 is being scanned, the terms of the following equation must be met:

$$\text{Tentative Countdown } (CD1) = PC\text{-}3 \cdot \overline{PC\text{-}4} \cdot \overline{PC\text{-}3'} \quad (10)$$

Figure 10A:
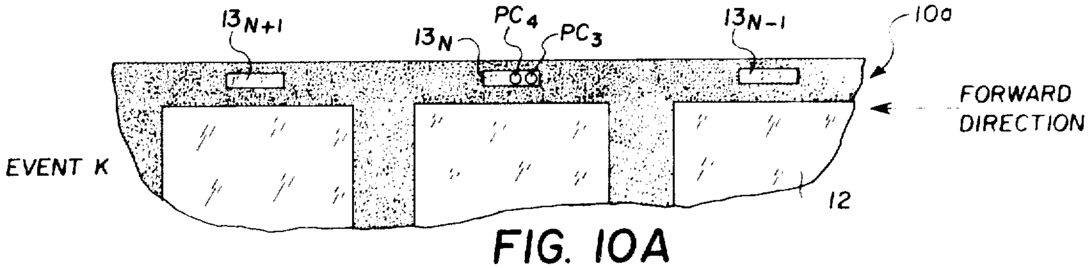
Figure 10B:
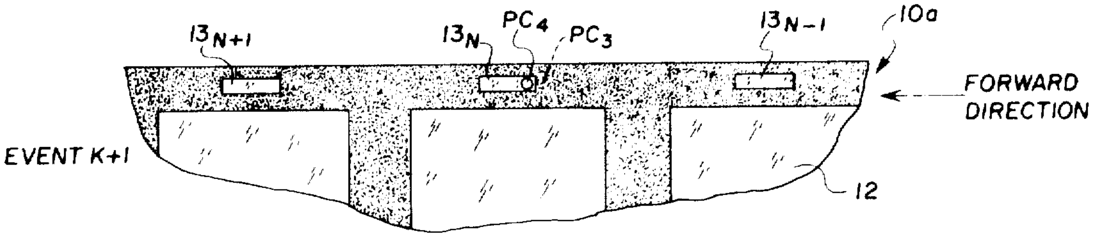

With regard to FIGS. 10A and 10B, the conditions of this equation are met when at event K+1, the photocell $PC_4$ is adjacent a clear portion of the strip 10*a* and the photocell $PC_3$ is adjacent an opaque portion of the strip 10*a*, and on the previous event K+1, the photocell $PC_3$ was adjacent a clear portion of the strip 10*a*.

With reference to the equations developed above, a set of rules may be developed for generating countup and countdown signals. With reference to equation 1 which defines the conditions for providing a tentative countup signal for a strip 10 of negative film which is being scanned on the first or standard row 14, the state PC-1' also exists at the occurrence of the tentative countup signal (CU1) and that this additional requirement or state may be added to equation 1 as a redundancy check. Thus, equation 1 may be rewritten to include a redundancy check as follows:

$$CU1=PC\text{-}1\cdot PC\text{-}2\cdot PC\text{-}1'\cdot\overline{PC\text{-}2'} \qquad (11)$$

In a like manner, the equation 2 derived from the negative strip 10 whose first row 14 is being scanned and the equations 3 and 4 derived for the positive strip 10 whose second or duorow 16 is being scanned, may contain a redundant term. Thus, where NEG is used to indicate the use of a strip 10 of negative film, $\overline{NEG}$ is used to indicate a strip 10*a* of positive film, A is used to indicate that the standard or first row 14 is being scanned, and $\bar{A}$ is used to indicate that the second or duorow 16 is being scanned, the following rule can be formulated:

$$COUNTUP=CU1\cdot CU2 \qquad (12)$$

where $CU1=NEG[A(PC\text{-}1\cdot PC\text{-}2\cdot PC\text{-}1'\cdot\overline{PC\text{-}2'})+\bar{A}(PC\text{-}3\cdot PC\text{-}4\cdot\overline{PC}\text{-}3'\cdot PC\text{-}4')]+\overline{NEG}[A(PC\text{-}1\cdot\overline{PC\text{-}2}\cdot\overline{PC\text{-}1'}\cdot PC\text{-}2')+\bar{A}(\overline{PC\text{-}3}\cdot\overline{PC\text{-}4}\cdot PC\text{-}3'\cdot\overline{PC\text{-}4'})]$.

It is noted that 2 2 is formed from a CU1 signal on the previous event and it remains a logical "1" signal until the event following a CD1 signal. In a similar fashion, the COUNTDOWN signal may be formulated as follows:

$$COUNTDOWN=CD1\cdot CD2 \qquad (13),$$

where $CD1=NEG[A(PC\text{-}1\cdot\overline{PC\text{-}2}\cdot PC\text{-}1'\cdot PC\text{-}2')+\bar{A}(\overline{PC\text{-}3}\cdot PC\text{-}4\cdot\overline{PC}\text{-}3'\cdot PC\text{-}4')]+\overline{NEG}[A(\overline{PC\text{-}1}\cdot PC\text{-}2\cdot\overline{PC\text{-}1'}\cdot PC\text{-}2')+\bar{A}(PC\text{-}3\cdot PC\text{-}4\cdot PC\text{-}3'\cdot PC\text{-}4')]$.

It is noted CD2 is formed from a CD1 signal derived on the previous event in an analogous manner.

The operations defined in equations 12 and 13 are implemented by sequence detection circuit 20, an illustrative embodiment of which is shown in FIGS. 13A and 13B. Since the photocells $PC_1$, $PC_2$, $PC_3$ and $PC_4$ are always active, it is first necessary to disable one pair of the photocells that is not being presently used to scan one of the rows of images. As shown in FIGS. 13A and 13B this is accomplished by disposing a switch 104 in its first position to thereby cause a NAND-gate 111 to generate a high or "1" signal which is applied through terminal B of a pair of AND-gates 50 and 52 to thereby enable the AND-gates 50 and 52. Conversely, when it is desired to scan the second or duorow 116, the switch 104 is disposed to its second position so that as will be explained in detail later, the NAND-gate 112 will generate a "1" or high signal to thereby enable a pair of AND-gates 51 and 53 through terminal S. Thus, dependent the position of switch 104, either of the pair of AND-gates 50 and 52, or 51 and 53 will be enabled to allow the input signal derived from either set of photocells to be applied to a pair of NOR-gates 56 and 57.

Figure 11A:
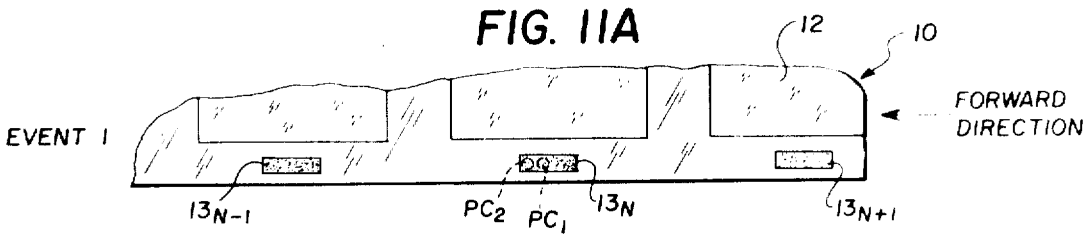
FIGS. 11A, 11B, 11C, 11D and 11E show in succession the various events as the strip of microfilm is moved forward and represent collectively a complete cycle of the advancement of a counting mark past the pair of photocells $PC_1$ and $PC_2$.

With reference to FIGS. 11A, 11B, 11C, 11D and 11E there will now be explained in detail the operation of the sequence detection circuit 20 shown in FIGS. 13A and 13B, for processing the signals derived from the photocells. As shown in FIG. 11A, a strip 10 of negative film is being moved in a first forward direction and is being scanned on its first row 14 of images. At event 1, the counting mark $13_N$ is disposed so as to cover the photocells $PC_1$ and $PC_2$ which in turn generate a high or "1" signals to be applied to the *a* inputs of the AND-gates 50 and 52, which as explained above are enabled. In response to these signals, the AND-gates 50 and 52 apply a high or "1" signal to the *a* inputs of the NOR-gate 56 and 57 so that both of the NOR-gates 56 and 57 produce low or "0" output signals. The "0" output signals derived from the NOR-gate 56 is applied to the K-input of the J-K flip-flop 68 and is applied also through a NAND-gate 60, which is used as an inverter, to the J-input of the J-K flip-flop 68. In a similar manner, the output signal derived from the NOR-gate 57 is applied to K-input of a flip-flop 70 and applies also through a NAND-gate 61, which is used as an inverter, to the J-input of the J-K flip-flop 70.

As shown in FIGS. 13A, the J-K flip-flops 68 and 70 have J- and K-inputs, Q- and $\bar{Q}$-outputs, and a clock pulse input (CP). The J-K flip-flops 68 and 70 operate in the following manner:

1. When a clock pulse which is generated in a manner to be described, is low or "0" signal, the Q- and $\bar{Q}$-outputs remain the same, independent of the signals applied to the J- and K-inputs, and 2. When the clock pulse rises to a high or "1" signal, the signals applied to the inputs J and K are transferred into an internal latch or storage portion of the flip-flops 68 and 70, and 3. When the clock pulse falls to a "0" signal, the internally stored input data transfers to the outputs Q and $\bar{Q}$ according to the following rules:

| If, at the moment the clock rises, the inputs are: | Then, when the clock pulse falls, the outputs will be: |
|---|---|
| J=1, K=0 | Q=1, $\bar{Q}$=0 |
| J=0, K=1 | Q=0, $\bar{Q}$=1 |
| J=0, K=0 | Q & $\bar{Q}$ will remain the same |
| J=1, K=1 | Q & $\bar{Q}$ will become the opposite of their former state |

Figure 11B:
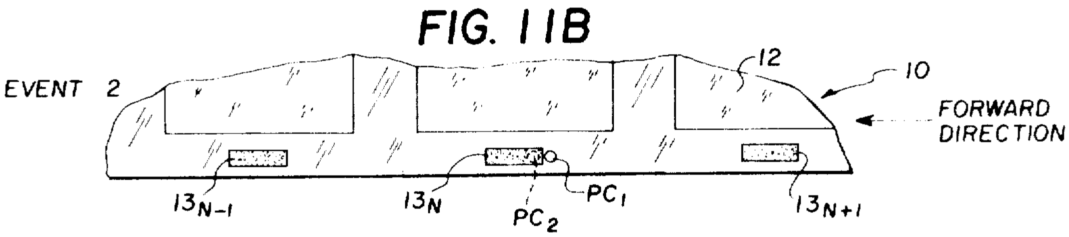

As will be explained later, the initial condition of the outputs Q of the flip-flop 68 and 70 are "1" and "0," respectively. On event 2, as shown in FIG. 11B, the photocell $PC_1$ is no longer covered by the opaque mark $13_N$, whereas the photocell $PC_2$ is still opposite or covered by the opaque mark $13_N$. The photocells $PC_1$ and $PC_2$ will apply respectively a "0" and a "1" signal to the *b* inputs of the NAND-gates 50 and 52, which in turn produce a "0" and a "1" signal respectively. In response to the "0" signal applied to the *a* input, the NOR-gate 56 will generate a "1" signal; whereas in response to the "1" signal generated by the NAND-gate 52, the NOR-gate 57 will generate a "0" signal. After inversion by the NAND-gates 60 and 61, a "0" and a "1" signal will be respectively applied to the J-inputs of the flip-flops 68 and 70. Upon the fall of the next clock pulse, the "1" signal previously applied to the J-input of the flip-flop 70 will be produced at its Q-output, and the "1" signal previously applied to the J-input of flip-flop 68 will be produced at its $\bar{Q}$ output.

Further, the "1" and "0" signals generated during event 2 respectively by the NOR-gates 56 and 57 will be applied to the *a* and *b* inputs of the AND-gates 64 and 63 respectively. After inversion by the AND-gate 60 and 61, a "0" signal will be applied to the *a* input of the AND-gate 63, and a "1" signal will be applied to the *b* input of the AND-gate 64. As a result, the AND-Gates 63 and 64 generate respectively a "0" and a "1" signal which will be applied in turn to the inputs of a NOR-gate 66, which generates in response thereto a "0" signal. Thus, it will be noticed that at every event, the output of the NOR-gate 66 will change regardless of the sequence of steps and whenever one of the photocells changes it signal or state. In response to the change of state of NOR-gate 66 at every event, a clock circuit 75 generates a clock signal, which is applied to the various storage devices including flip-flops 68 and 70 of the circuits shown in FIGS. 13A and 13B. More specifically, whenever the output of the NOR-gate 66 becomes a high or "1" signal, the "1" signal is differentiated by a circuit composed of a capacitor $C_1$ and resistor $R_1$. The differentiated output derived from resistor $R_1$ is a positive pulse which is applied to the input of NAND-gate 78, which acts in turn as an inverter to provide a negative pulse to NAND-gate 80. The NAND-gate 80 generates in response thereto a "1" signal which is applied to a NAND-gate 81. The NAND-Gate 81 acts as an inverter to apply a "O" signal to the *a* input of NAND-gate 82. Whenever electrical power is applied to the circuit 20, a "1" signal will be applied to the *b* input of the NAND-gate 82. In a similar manner, whenever the NOR-gate 66 generates a low or "0" signal, a NAND-gate 77 acting as an inverter will apply a "1" or high signal to a differentiating circuit comprising a capacitor $C_2$ and a resistor $R_2$. A positive pulse is derived from the resistor $R_2$ and applied to a NAND-gate Thusc which acting an inverter applies a negative pulse to the *b* input of NAND-gate 80. In response to the negative pulse, the NAND-gate 80 applies a "1" signal to the NAND-gate 81, which in turn applies a "0" signal to the *a* input of the NAND-gate 82. In response to "0" signal, the NAND-gate 82 generates a "1" signal. Since the NOR-gate 66 generates either a "0" or "1" signal whenever a photocell changes state, there will always be a positive pulse C2 generated by the NAND-gate 82 whenever a photocell changes its state, and this series of pulses C2 is used as 161 reference signal against which other events may be measured and detected. More specifically, the clock pulses C2 generated by the NAND-gate 82 are applied to the CP (clock pulse) input of the flip-flops 68 and 70 to thereby effect a transfer of the stored state from the inputs to the outputs as explained above.

When photocell $PC_1$ generates a "1" signal, a "1" signal and a "0" signal are respectively applied to the J- and K-inputs of the flip-flop 68, after a period of time corresponding to that in which it took the AND-gates 50 and 52 (51 and 53), NOR-gates 56 and 57 and NAND-gates 60 and 61 to react. Meanwhile, the clock pulse C2 is generated when the photocell $PC_1$ generates a "1" signal; however, it requires seven or eight gate delays before NAND-gate 82 generates a clock pulse C2. The extra time required for the clock pulse C2 to be applied to the CP input of flip-flops 68 and 70 insures that the signals applied to the J- and K-inputs corresponding to the most recent event, will be present and stable by the time the clock pulse C2 is applied. The pulse length of the clock pulse C2 (which is controlled by the values of the capacitors C1 and C2, and resistors R1 and R2 is approximately 5 microseconds (msecs). At the fall of the clock pulse C2, the input signals will be transferred to the outputs Q and Q'It is noted that the output Q of the flip-flop 68 will become a "1" signal approximately 5 $\mu$sec after the photocell $PC_1$ generates a "1" signal. Thus after the 5-microsecond delay, the output Q of the flip-flop 68 and 70 does not meet the definition of PC-1' is designed to be the state of the photocells at the previous event. However, before the expiration of the 5 $\mu$sec., the outputs Q of the flip-flops 68 and 70 do represent the previous states of the photocells PC1 and PC2 and the signals applied to the inputs J of the flip-flops 68 and 70 is representative of the present state of the photocells $PC_1$ and $PC_2$.

Figure 11C:
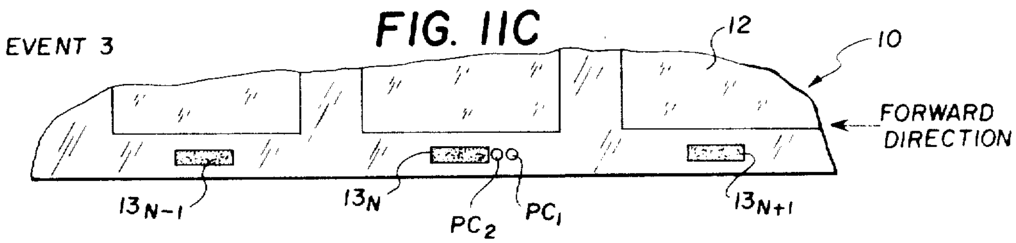
Figure 11D:
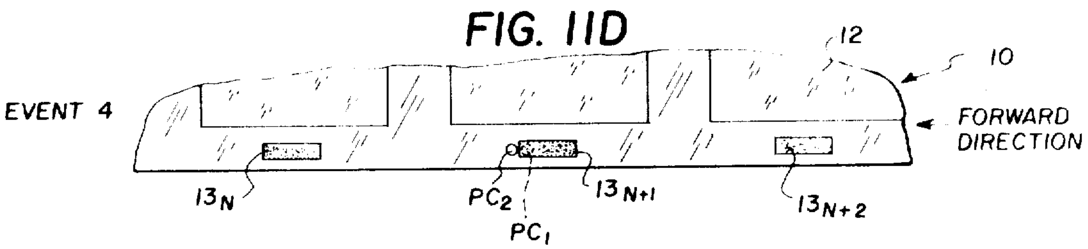
Figure 11E:
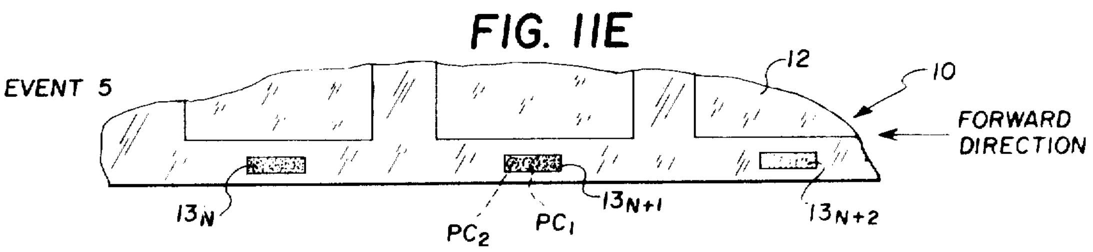

With reference to FIG. 11C, both of the photocells $PC_1$ and $PC_2$ are uncovered at event 3 by the counting mark $13_N$. As a result, the photocells $PC_1$ and $PC_2$ generate "0" signals which causes in a manner similar to that described above, NOR-gates 56 and 57 to generate and apply "1" signals to the NAND-gates 60 and 61. After inversion, "0" signals are applied to the inputs J of the flip-flops 68 and 70. Upon the fall of the next clock pulse C2"0" signals are transferred to the Q-outputs of flip-flops 68 and 70. As shown in FIG. 11D, photocell $PC_1$ is covered at event 4 by counting a mark $13_N$+1 whereas the photocell $PC_2$ remains uncovered by an adjacent clear portion of the strip 10. As a result, the photocells $PC_1$ and $PC_2$ generate a "1" and a "0" signal respectively. In a manner similar to that described above, the NOR-gtes 56 and 57 will produce respectively a "0" and a "1" signal, which after inversion by the NAND-gates 60 and 61, are applied to the J-inputs of the flip-flops 68 and 70. Before the fall of the present clock signal a "0" signal will appear on the Q-output of the flip-flop 68, and a "1" signal will appear on the Q-output of the flip-flop 70. Finally, at event 5, the next conducting mark $13_N$+1 covers both of the photocells $PC_1$ and $PC_2$. As a result, photocells $PC_1$ and $PC_2$ will generate "1" signals and in a manner similar to that described above, the NOR-gates 56 and 57 will produce "0" signals. After inversion by the NAND-gates 60 and 61, "1" signals are applied at the J-inputs of the flip-flops 68 and 70. In summary, the various states of the photocells, NOR-gates 56 and 57, and flip-flops 68 and 70 will now be given in a chart as follows:

| Event | $PC_1$ | $PC_2$ | NOR gate 56 | NOR gate 57 | NOR gate 66 | Q output of Flip-Flop 68 | Q output of Flip-Flop 70 |
|---|---|---|---|---|---|---|---|
| 1 | 1 | 1 | 0 | 0 | 1 | 1 | 0 |
| 2 | 0 | 1 | 1 | 0 | 0 | 1 | 1 |
| 3 | 0 | 0 | 1 | 1 | 1 | 0 | 1 |
| 4 | 1 | 0 | 0 | 1 | 0 | 0 | 0 |
| 5 | 1 | 1 | 0 | 0 | 1 | 1 | 0 |

The signals shown for the Q-outputs of flip-flops 68 and 70 (see last two columns of the above chart) are the states existant prior to the falling of the clock pulse C2 on the given event. With reference to FIG. 13A and to the chart above, it may be understood that the signals applied to the J- and K-inputs of the flip-flop 68 satisfy the definitions of PC-1 and $\overline{PC-1}$ (or PC-3 and $\overline{PC-3}$ dependent upon the position of switch 104). In addition, the signals generated at the Q- and $\overline{Q}$-outputs of flip-flop 68 (as shown in the title) satisfy respectively the definition of PC-1' and $\overline{PC-1'}$ or PC-3' and $\overline{PC-3'}$). In a similar manner, the signals applied to the J- and K-input of flip-flop 70 satisfy the definitions of PC2 and $\overline{PC2}$ or (PC4 and $\overline{PC4}$), and the output signals provided at the outputs Q and $\overline{Q}$ satisfy the definitions of the terms PC2' and $\overline{PC2'}$ (or PC4' and $\overline{PC4'}$). With reference to equations 1 and 2 for CU1 and CD1 respectively, it may be seen that the circuit 20 has generated signals to satisfy the various terms of these equations. These terms will now be combined in a manner to be explained to satisfy the various equations defined above to provide signals CU1 and CD1 indicative of a tentative countup or countdown.

With reference to FIGS. 13A and 13B, there is shown NAND-gates 88 to 95, which in response to the application of "1" signals at each of its inputs will generate a "0" signal. For example, NAND-gate 88 has inputs *a, b, c, d, e* and *f* which are connected respectively to a switch 102 (See FIG. 13B), the J-input of flip-flop 68, the J-input of flip-flop 70, the Q-output of flip-flop 68, the $\overline{Q}$-output of flip-flop 70, and to the output of NAND-gate 111 (See FIG. 13B). As explained above, the "1" signal generated by the NAND-gate 111 is indicative that the counting marks 13 associated with the first or standard row 14 are being scanned. In FIG. 13B, there is shown a switch 102 which when disposed in its first position will cause a "1" signal to be applied to the input *a* of the NAND-gate 88. The position of the switch 102 indicates the type of film, i.e., positive or negative, that is being scanned by the photocells $PC_1$, $PC_2$, $PC_3$ and $PC_4$. The switch 102 is disposed in its first position to indicate the scanning of negative film and in its second position to indicate the scanning of positive film. The other inputs to the NAND-gate 88 are indicative of the following terms: PC1, PC2, PC1' and $\overline{PC2'}$. With reference to equation 1, it may be understood that these four terms satisfy the definition of a tentative countup signal. Thus, when all "1" signals are applied to the inputs of the NAND-gate 88, a "0" signal will be generated which is indicative that a strip 10 of negative fiim is being scanned on its first or standard row and that the conditions for a tentative countup manifestation have been met. The signal generated by the NAND-gate 88 may be designated $\overline{UNS}$ indicating that a tentative countup signal has been derived for a negative film strip 10 whose first or standard row 14 is being scanned. The bar over the UNS indicates that when the condition is true, i.e., when the condition exists for counting up with negative film on the standard row, then the signal is low or a "0" signal. In a similar manner, the "0" signals generated by the NAND-gates 89, 90 and 91 are tentative countup manifestations. More specifically, a "0" signal generated by the NAND-gate 89 is indicative that a strip 10*a* of the positive film is being scanned on its first or standard row 14, that the strip 10*a*is being driven in a first or forward direction and that the conditions for tentative countup have been met. The signal generated from the NAND-gate 89 may be designated $\overline{UPS}$, in a manner analogous to that described above. Similarly a "0" or low signal generated by the NAND-gate 90 is indicative that a strip 10 of negative film is being scanned on its second or duorow 16 and that the conditions for a tentative countup signal CU1 have been met; such a signal may be designated $\overline{UND}$. A "0" signal generated by the NAND-gate 91 is indicative that a strip 10*a* of positive film is being scanned on its second or duorow 16 and that the conditions for a tentative countup signal have been satisfied. The signal generated by NAND-gate 91 may be designated $\overline{UPD}$.

As shown in FIGS. 13A and B, the signals $\overline{UNS}$, $\overline{UPS}$, $\overline{UND}$ and $\overline{UPD}$ as generated respectively by NAND-gates 88, 89 90, and 91, are applied to the inputs of a NAND-gate 98. If any one of the inputs of the NAND-gate 98 is a low or "0" signal, the output thereof will be high or "1" signal indicative of a tentative countup CU1 manifestation.

In an analogous manner, an indication that the terms of the equation 2 for CD1 are met, is provided by low or "0" signals generated by NAND-gates 92 and 95. More specifically, a "0" signal generated by NAND-gate 92 is indicative that the conditions for a tentative countdown signal have been met for a strip 10 of negative film which is being moved in a second or backward direction and whose first or standard row is being scanned. When a "0" signal is generated by the NAND-gate 93, this is an indication that a strip 10*a* of positive film is being scanned on its first or standard row 14 and that the strip 10*a* is being driven in a second or backward direction. A low signal generated by the NAND-gate 94 is indicative that the conditions for a tentative countdown CD1 signal have been met and that a strip 10 is being driven in a forward direction. In a similar manner, a low or "0" signal generated by the NAND-gate 95 indicates that the conditions of a tentative countdown signal CD1 have been met and in particular, that a strip 10*a* of positive film is being scanned on its second or duorow 16 and that the strip 10*a* is being driven in a forward direction. As shown in FIG. 13B, the output signals derived from the NAND-gates 92, 93, 94 and 95 are applied to the four inputs of a NAND-gate 100. Thus, if any one of the input signals derived from the NAND-gates 92, 93, 94 and 95 becomes a low or "0" signal, the NAND-gate 100 would produce a high or "1" signal, thus indicating a tentative countdown signal.

As discussed above, a tentative countup signal CU1 or countdown signal CD1 is only a preliminary indication that a countup or countdown signal should be generated. As indicated in equations 3 and 4, it is necessary to generate two successive tentative countup or countdown signals before a corresponding energizing signal is applied to the counting circuit and memory 28. As shown in FIG. 13B, the output signals derived from the NAND-gate 98 and the NAND-gate 100 are applied respective to the J- and K-inputs of a storage device such as a J–K flip-flop 114. The clock pulses C2 derived from the NAND-gate 82 of the clock circuit 75 are applied to the CP input of the J–K flip-flop 114 through terminal T. It may be understood that the J–K flip-flop 114 operates in a manner similar to that described for flip-flops 68 and 70. In order to satisfy equations 3 and 4, the terms CU2 and CD2 are derived from the outputs Q and $\overline{Q}$ of the J–K flip-flop 114 respectively. As explained above, the input signals applied to the J- and K-inputs of the flip-flop 114 are respectively the CU1 and CD1 signals. The CU2 signal derived from the Q-output of the flip-flop 114 and the CU1 signal derived from the input J of the flip-flop 114 are applied to a NAND-gate 116. The third input signal applied to the NAND-gate 116 is the clock signal C2 which is added to insure that the output signals generated by the NAND-gate 116 occur within the 5 μsec. after a photocell change. Thus, when the three input signals CU1 , CU2 and C2 are applied concurrently to the inputs of the NAND-gate 116, a common countup signal will be generated and applied along conductive path 34 to the counting circuit and memory 28. This signal may be designated as $\overline{CT.UP}$. The signal generated by the NAND-gate 116 may be applied to a NAND-gate 119 which acts as an inverter to provide a signal the logical opposite of $\overline{CT.UP}$, i.e., a CT.UP signal.

Assuming that the strip 10 of film has been moving in a countup direction, a previous CU1 signal has been generated and applied to the J-input of flip-flop 114 approximately five gate delays after the corresponding photocell has changed. The CU1 signal will last until just after the clock signal C2 has fallen to a low or "0" signal. The clock signal C2 required approximately seven gate delays to become a "1" or high signal after the corresponding photocell change. Consequently, the input data applied to the J- and K-inputs of the flip-flop 114 is applied or set before the clock signal C2 begins to rise. After its initial rise, the clock signal C2 requires approximately 5 μsec. before it returns to a low or "0" signal to thereby transfer the input signals applied to the inputs J and K to the outputs Q and $\overline{Q}$ of the flip-flops 114, 68 and 70. Thus, on the first CU1 signal, a CU2 signal is generated at the Q-output of the flip-flop 114 approximately 5 μsec. later. The CU2 signal does not produce a countup signal from the NAND-gate 116 because the clock signal C2 applied to the input of the NAND-gate 116 has gone to "0" or low signal before the appearance of the signal CU2. However, the CU2 signal appearing at the Q-output of the flip-flop 114 remains a high or "1" signal if the strip 10 continues to move in the same direction and when the next CU1 signal occurs, a countup signal will be generated by the NAND-gate 116 due to the simultaneous presence 2 the CU1, CU2and C2 signals. As long as the strip 10 continues to move in the same direction, the CU2 signals appearing at the Q-output of the flip-flop 114 will remain a "1" signal and countup signals will be produced at the sensing of every counting mark 13. It is noted that at every event, a clock pulse C2 is provided to thereby trigger the flip-flop 114. For most of these events, there is no CU1 or CD1 signal applied to either the J- or K-inputs of the flip-flop 114. Since both of the signals applied to the J- and K-inputs are a "0" signal, the outputs derived from the flip-flop 114 will remain the same and therefore the countup signal imposed on the Q-output of the flip-flop 114 remains the same.

If the strip 10 of film is reversed in direction, then CU1 signals can no longer be generated. Within one to four events after the strip reversal, CD1 signal will be generated and applied to the input K of flip-flop 114. Since the CD2 signal has not yet been established on the output Q of the flip-flop 114, simultaneous input signals will not be applied to the NAND-gate 117 to thereby generate a countdown signal at the first CD1 signal after film reversal. When the clock signal C2 falls, the CD2 signal will appear as a "1" signal on the output $\overline{Q}$. Thus, when subsequent CD1 signals are applied to the K-input, a high signal Cd2 will be established at the $\overline{Q}$ output of the flip-flop 114 and will be applied to the NAND-gate 117, in response thereto, the NAND-gate 117 will produce a "0" output signal. In turn, the output signal from the NAND-gate 117 is applied to a NAND-gate 120 which acts as an inverter to provide a countdown signal (designated as CT.DN), which may be applied along the conductive path 35 to the counting circuit and memory 28. When the strip 10 reverses from a countdown to a countup direction, an analogous sequence of events will occur to produce a countup signal on the second CU1 signal.

As explained above with respect to FIG. 13B, the switch 104 which may be disposed from a first position to a second position to thereby deenergize a solenoid 106 thus opening contact 108 and closing contact 109. As a result, the *b* input of the NAND-gate 112 is applied to ground to thereby establish a "0" signal at the *b* input. In opening contact 108, an open circuit is applied to the *a* input of the NAND-gate 111 to thereby establish a logical "1" signal at the *a* input of the NAND-gate 111. As shown in FIG. 13B, the NAND-gates 111 and 112 are cross latched to eliminate the possibility that the output signals derived from the NAND-gates 111 and 112 will both be a "0" signal at the same time. Thus, the output signal produced by one of the NAND gates will be applied to an input of the other NAND-gate to thereby cause the other NAND gate to change its state. The necessity of cross latching the NAND-gates 111 and 112 is to avoid any possible adverse effects on the search operation of the strip 10. It may be understood that if a "0" signal appeared at the output of both of NAND-gates 111 and 112, it would be possible to end the search and to erase the information stored on the keyboard memory 24.

Thus, in summary a cartridge containing a roll of the strip 10 of microfilm may be inserted into a reader having a suitable drive apparatus for withdrawing and directing the strip 10 past a utilization or projection station 17 at which the plurality of counting marks 13 are sensed. If it is desired to count the counting marks 13 associated with the first row 14 of images 12, the switch 104 is disposed in its first position. As the strip 10 is moved in a first or forward direction as seen in FIG. 1, the radiation emitted by the source 47 will be repeatedly interrupted by the counting marks 13 and corresponding signals will be generated by the photocells PC1 and PC2 to thereby provide the appropriate signals for the indication of a countup or a countdown. At the end of scanning the first row 14, the second row 16 of images may be counted by simply having the operator dispose the switch 104 in a second position. It is noted that it is within the contemplation of this invention that suitable means be provided within the strip-handling apparatus for sensing the end of the strip 10. For example, the tension imposed upon the strip 10 could be sensed or a suitable mark could be placed at the end of the strip 10 to thereby indicate that it was desired now to scan the second row 16 of images. As the countup or countdown signals are generated by the sequence detection circuits, they are recorded and counted by the circuit 28 to be displayed upon the display device 30. Thus, at the end of counting the first row 14 of the images 12 upon the strip 10 illustratively shown in FIG. 1, a count of 10,000 would be displayed upon the device 30. Upon scanning backward, the photocells PC3 and PC4 will detect the counting marks 13 associated with the images of the second row 16 and will provide countup signals as the strip 10 is moved in the second or backward direction to provide countup signals from 10,000 to 20,000 as the strip 10 is returned into its cartridge.

The invention has been described in detail with particular reference to a preferred embodiment thereof, but it will be understood that variations and modifications can be effected within the spirit and scope of the invention.

I claim:

1. Apparatus for accessing a selected image from a plurality of information images placed in first and second rows on a strip of information-bearing medium movable in first and second directions, the information-bearing images of the first and second rows having associated therewith first and second sets of count marks to be sensed and counted to indicate the number of the information-bearing images moved past said apparatus said apparatus comprising:

first and second means disposed along the direction of strip movement to sense the count marks of the first set and to provide first and second signals respectively as the first set of marks is moved thereby in a series of events, an event being when one mark is disposed so as to be sensed or not sensed by one of said first and second sensing means;

third and fourth means disposed along the direction of strip movement for sensing the count marks of the second set and for providing first and second signals respectively as the second set of marks is moved thereby in a series of events, an event being when a mark is disposed so as to be sensed or not sensed by one of said third and fourth sensing means; and interpretation means sensitive to the presence of the first and second signals on the current event and to the absence of the second signal on the prior event as the strip is moved in the first direction, and to the presence of the third and fourth signals on the current event and to the absence of the third signal for the prior event as the strip is moved in the second direction to provide tentative countup manifestations.

2. Apparatus as claimed in claim 1 wherein said interpretation means is sensitive to the presence of the first signal and the absence of the second signal on the current event and to the presence of the second signal on the prior event as the strip is moved in the second direction, and to the absence of the third signal and the presence of the fourth signal on the current event and to the presence of the third signal on the prior event to provide tentative countdown manifestations.

3. Apparatus as claimed in claim 1, wherein there is included means responsive to two consecutive, tentative countup manifestations to provide a positive countup signal.

4. Apparatus as claimed in claim 1, wherein there is included means responsive to two consecutive, tentative countup manifestations to provide a positive countup manifestation and responsive to two consecutive, tentative countdown manifestations to provide a positive countdown manifestation.

5. Apparatus for sensing and providing manifestations of first and second sets of marks placed on a strip of an information-bearing medium movable in first and second directions, the manifestations to be summed to indicate the number of the marks sensed, said apparatus comprising:

first and second means disposed along the direction of strip movement to sense the marks of the first set and to provide first and second signals respectively as the strip is moved thereby;

third and fourth means disposed along the direction of strip movement to sense the marks of the second set and to provide third and fourth signals respectively as the strip is moved thereby;

first storage means for receiving and storing the first and second signals to provide at a later point in time first and second stored signals corresponding respectively to the first and second signals;

second storage means for receiving and storing the third and fourth signals to provide at a later point in time third and fourth stored signals corresponding respectively to the third and fourth signals; and first interpretation means sensitive to the simultaneous presence of the first and second signals, and absence of the second stored signal, and to the simultaneous presence of the third and fourth signals and the absence of the third stored signal to provide tentative countup manifestations.

6. Apparatus as claimed in claim 5, wherein there is included second interpretation means sensitive to the simultaneous presence of the first signal, the absence of the second signal and the presence of the second stored signal, and sensitive to the simultaneous absence of the third signal, the presence of the fourth signal and the presence of the third storage signal to provide tentative countdown manifestations.

7. Apparatus as claimed in claim 5, wherein there is included third storage means for receiving and storing the tentative countup manifestations and for providing stored, tentative manifestations corresponding thereto at a later point in time, and logic means responsive to the simultaneous presence of a tentative countup manifestation and a stored tentative countup manifestation to provide a positive countup manifestation.

8. Apparatus as claimed in claim 6 wherein there is included third storage means responsive to tentative countup manifestations to provide at a point later in time stored tentative countup manifestations, first logic means responsive to a stored tentative countup manifestation and a tentative countup manifestation to provide a positive countup manifestation, fourth storage means responsive to tentative countdown manifestations to provide at a point later in time stored tentative countup manifestations, and second logic means responsive to a tentative countdown manifestation and a stored tentative countdown manifestation to provide a positive countdown manifestation.

9. Apparatus for accessing one of a plurality of information-bearing images disposed in first and second rows on a strip of information-bearing medium movable in first and second directions, the information-bearing images of the first and second rows having respectively first and second sets of marks associated therewith, the marks to be counted to access a selected information-bearing image, said apparatus comprising:

first and second means disposed along the direction of strip movement for sensing the marks of the first set and for providing first and second signals respectively indicating the presence of the marks of the first set as the first set of marks is moved thereby in a series of events, an event being when one mark is disposed so as to be sensed or not sensed by one of said first and second sensing means;

third and fourth means disposed along the direction of strip movement for sensing the marks of the second set and for providing third and fourth signals respectively indicating the presence of the marks of the second set as the second set of marks is moved thereby in a series of events, an event being when one mark is disposed so as to be sensed or not sensed by one of said third and fourth sensing means;

first storage means for receiving at the immediately prior event and storing the first and second signals to provide at a current event first and second stored signals corresponding respectively thereto;

second storage means for receiving at the immediately prior event and storing the third and fourth signals to provide at the current event third and fourth stored signals corresponding respectively thereto;

first logic means responsive to the movement of the strip in the first direction and to the simultaneous presence of the first signal, the second signal and the absence of the second stored signal to provide a tentative countup manifestation; and second logic means responsive to the movement of the strip in the second direction and to the simultaneous presence of the third signal, the fourth signal and the absence of the third stored signal to provide a tentative countup manifestation.

10. Apparatus as claimed in claim 9 wherein there is included third logic means responsive to the movement of the strip in the second direction and to the simultaneous presence of the first signal, the absence of the second signal and the presence of the second stored signal to provide a tentative countdown signal; and fourth logic means responsive to the movement of the strip in a first direction and to the simultaneous absence of the third signal, the presence of the fourth signal and the presence of the third stored signal to provide a tentative countdown signal.

11. Apparatus as claimed in claim 10 wherein there is included third storage means for receiving at the immediately prior event a tentative countup signal and for providing at the current event a stored, tentative countup signal corresponding thereto, and fifth logic means responsive to the simultaneous presence of a tentative countup signal and a stored tentative countup signal to provide a positive countup signal.

12. Apparatus as claimed in claim 10, wherein there is included third storage means for receiving at the immediately prior event a tentative countup signal and providing at the current event a stored tentative countup signal corresponding thereto, fifth logic means responsive to the simultaneous presence of a tentative countup signal and a stored tentative countup signal to provide a positive countup signal, fourth storage means for receiving at the immediately prior event a tentative countdown signal and for providing at the current event a stored, tentative countdown signal corresponding thereto and sixth logic means responsive to the simultaneous presence of a tentative countdown signal and a stored tentative countdown signal to provide a positive countdown signal.

13. Apparatus as claimed in claim 12 wherein there is included counting and memory means for adding and subtracting respectively the positive countup and countdown signals to provide and store a signal indicative of the number of the information-bearing images being moved past said first, second, third and fourth sensing means; input memory means for receiving and storing the number of the information-bearing image to be disposed at said utilization station; and comparison means responsive to said counting and memory means and said input memory means for sensing the coincidence between the numbers provided therefrom to thereby direct the selected image to said utilization station.

14. Apparatus for sensing and providing manifestations of first and second set of marks placed on a strip of an information-bearing medium movable in first and second directions, said apparatus comprising:

first sensing means disposed along the direction of strip movement of provide a first signal having first and second states indicative of the presence and absence respectively of a mark of the first set;

second sensing means disposed along the direction of a strip movement to provide a second signal having first and second states indicative of the presence and absence respectively of a mark of the first set;

third sensing means disposed along the direction of strip movement to provide a third signal having first and second states indicative of the presence and absence respectively of a mark of the second set;

fourth sensing means disposed along the direction of strip movement of to provide a fourth signal having first and second states indicative of the presence and absence respectively of a mark of the second set;

first storage means for receiving and storing the first and second signals to provide at a later point in time first and second stored signals corresponding respectively thereto the first and second stored signals each having first and second states;

second storage means for receiving and storing the third and fourth signals to provide at a point later in time third and fourth stored signals corresponding respectively thereto the third and fourth stored signals each having first and second states; and interpretation means sensitive to the simultaneous presence of the first states of the first and second signals and the second state of the second stored signal, and to the simultaneous presence of the second state of the second logic signal, the first state of the fourth signal and the first state of the third stored signal to provide countup manifestations.

15. Apparatus as claimed in claim 14, wherein there is included second interpretation means sensitive to the simultaneous presence of the first state of the first signal, the second state of the second signal and the first state of the second stored signal, and to the simultaneous presence of the first state of the third signal of the fourth stored signal to provide countdown manifestations.

16. Apparatus for sensing and providing manifestations of first and second sets of marks placed on a strip of an information-bearing medium movable in first and second directions, the manifestations to be summed to indicate the number of the marks sensed, said apparatus comprising:

first and second means disposed along the direction of strip movement to sense the marks of the first set and to provide first and second signals respectively as the strip is moved thereby;

third and fourth means disposed along the direction of strip movement to sense the marks of the second set and to provide third and fourth signals respectively as the strip is moved thereby;

fourth storage means for receiving and storing the first and second signals to provide at a later point in time first and second stored signals corresponding respectively to the first and second signals, and for receiving and storing the third and fourth signals to provide at a later point in time third and fourth stored signals corresponding respectively to the third and fourth signals; and first interpretation means sensitive to the simultaneous presence of the first and second signals and the absence of the second stored signal, and sensitive to the simultaneous presence of the third and fourth signals and the absence of the third stored signal to provide tentative countup manifestations.

17. Apparatus as claimed in claim 16, wherein there is included second interpretation means sensitive to the simultaneous presence of the first signal, the absence of the second signal and the presence of the second stored signal, and sensitive to the simultaneous absence of the third signal, the presence of the fourth signal and the presence of the third storage signal to provide tentative countdown manifestations.

* * * * *